US012717086B2

(12) United States Patent
Nesic et al.

(10) Patent No.: US 12,717,086 B2
(45) Date of Patent: Aug. 25, 2026

(54) OPTICAL COUPLING AND MODE-SELECTIVE SEPARATION OR SUPERPOSITION OF OPTICAL FIELDS

(71) Applicant: Karlsruher Institut für Technologie, Karlsruhe (DE)

(72) Inventors: Aleksandar Nesic, Stutensee (DE); Matthias Blaicher, Ettlingen (DE); Christian Koos, Siegelsbach (DE)

(73) Assignee: Karlsruher Institut für Technologie, Karlsruhe (DE)

( * ) Notice: Subject to any disclaimer, the term of this patent is extended or adjusted under 35 U.S.C. 154(b) by 16 days.

(21) Appl. No.: 17/995,618

(22) PCT Filed: Apr. 8, 2021

(86) PCT No.: PCT/EP2021/059147
§ 371 (c)(1),
(2) Date: Oct. 6, 2022

(87) PCT Pub. No.: WO2021/204933
PCT Pub. Date: Oct. 14, 2021

(65) Prior Publication Data
US 2023/0213703 A1 Jul. 6, 2023

(30) Foreign Application Priority Data
Apr. 9, 2020 (DE) ......................... 102020204641.7

(51) Int. Cl.
*G02B 6/27* (2006.01)
*G02B 6/26* (2006.01)

(52) U.S. Cl.
CPC ........... *G02B 6/2773* (2013.01); *G02B 6/262* (2013.01); *G02B 6/272* (2013.01); *G02B 6/2726* (2013.01)

(58) Field of Classification Search
CPC ...... G02B 6/262; G02B 6/272; G02B 6/2773; G02B 27/12; G02B 6/2726; G02B 27/126; B33Y 80/00
See application file for complete search history.

(56) References Cited

U.S. PATENT DOCUMENTS 7,127,131 B2 * 10/2006 Watts .................. G02B 27/283 385/11
7,228,015 B2 * 6/2007 Watts .................. G02B 6/2726 385/11

(Continued)

FOREIGN PATENT DOCUMENTS

JP 2001050860 A 2/2001
JP 2006505016 A 2/2006

(Continued)

OTHER PUBLICATIONS

Watts et al., Polarization splitting and rotating through adiabatic transitions, in Integrated Photonics Re-search, A. Sawchuk, ed., vol. 91 of OSA Trends in Optics and Photonics, 2003., 3 pages, Jan. 1, 2003.

(Continued)

*Primary Examiner* — John Bedtelyon
(74) *Attorney, Agent, or Firm* — Woodard, Emhardt, Henry, Reeves and Wagner, LLP

(57) ABSTRACT

The invention relates to an assembly for optical coupling and for mode-selective separation or overlaying of optical fields, to the use thereof and to a method for producing a waveguide-based optical coupling element (10) which is designed for mode-selective separation or overlaying of optical fields at a further optical coupling point (410) of an optical component (400). The assembly comprises at least one waveguide-based optical coupling element (10) having at least three optical coupling points (100, 370, 380), and at least one optical component (400) having at least one further (Continued)

optical coupling point (410), wherein at least one of the optical coupling points 100, 370, 380) is optically connected to the at least one further optical coupling point (410), and wherein the waveguide-based optical coupling element (10) is designed to transmit light highly efficiently and bidirectionally between eigenmodes (120, 260) associated with the first optical coupling point (100) and the second optical coupling point (370), and between eigenmodes (130, 280) associated with the first optical coupling point (100) and the third optical coupling point (380).

18 Claims, 23 Drawing Sheets

(56) References Cited

U.S. PATENT DOCUMENTS

| | | | | |
|---|---|---|---|---|
| 8,903,205 | B2 * | 12/2014 | Koos | G02B 6/30<br>385/14 |
| 9,034,222 | B2 | 5/2015 | Koos et al. | |
| 11,169,446 | B2 | 11/2021 | Dietrich et al. | |
| 2005/0254128 | A1 | 11/2005 | Watts | |
| 2008/0019637 | A1 | 1/2008 | Little et al. | |
| 2014/0376930 | A1 | 12/2014 | Shiba | |
| 2017/0176679 | A1 | 6/2017 | Oka | |
| 2018/0314005 | A1 | 11/2018 | Lin et al. | |

FOREIGN PATENT DOCUMENTS

| | | | |
|---|---|---|---|
| WO | 1992000185 | A1 | 1/1992 |
| WO | 2013111555 | A1 | 8/2013 |
| WO | 2016052344 | A1 | 4/2016 |
| WO | 2018083191 | A1 | 5/2018 |

OTHER PUBLICATIONS

Okamoto, Fundamentals of Optical Waveguides, Academic Press, 2006, pp. 154-155., 578 pages, Jan. 1, 2006.

Schumann et al., Hybrid 2D-3D optical devices for integrated optics by direct laser writing, Light Science and Applications, vol. 3, No. 6, 2014., 37 pages, Jan. 1, 2014.

Hahn et al., Polarizing beam splitter integrated onto an optical fiber facet, Optics Express, vol. 26, No. 25, 2018., 10 pages, Jan. 1, 2018.

Watts et al., Towards integrated polarization diversity: design, fabrication, and characterization of integrated polarization splitters and rotators, OFC/NFOEC Technical Digest. Optical Fiber Communication Conference, 2005, Anaheim, CA pp. 3 pp. vol. 5, 3 pages, Dec. 31, 2005.

Barwicz et al., Polarization-transparent microphotonic devices in the strong confinement limit, Nature Photon 1, 57-60 (2007), 4 pages, Jan. 31, 2007.

Barwicz et al., Supplementary Information for Polarization-transparent microphotonic devices in the strong confinement limit, Nature Photon 1, 57-60 (2007) Retrieved from the Internet: https://static-content.springer.com/esm/art%3A10.1038%2Fnphoton.2006.41/MediaObjects/41566_2007_BFnphoton200641_MOESM1_ESM.pdf, 6 pages, Jan. 31, 2007.

Gonzalez-Hernandez et al., Micro-optics 3D Printed via Multi-Photon Laser Lithography, Adv. Optical Materials, 2003., 19 pages, Jan. 4, 2023.

* cited by examiner

OPTICAL COUPLING AND MODE-SELECTIVE SEPARATION OR SUPERPOSITION OF OPTICAL FIELDS

FIELD OF THE INVENTION

The present invention lies in the field of integrated photonics and micro-optics and relates in particular to micro-optical and nano-optical systems, in which light is transferred between various optical components or between free space stretches and optical components by way of optical coupling points. In particular, the present invention relates to an arrangement for optical coupling and for mode-selective separation or superposition of optical fields and the use thereof, and to a method for producing a waveguide-based optical coupling element configured for mode-selective separation or superposition of optical fields at an optical coupling point of an optical component part.

PRIOR ART

The functionality of integrated-optical or micro-optical systems often depends decisively on whether the light to be transferred has a certain spatial distribution and polarization at the respective optical coupling points; for example, in order to obtain a high coupling efficiency, in order to facilitate an efficient excitation of certain waveguide modes in the case of waveguide-based components or in order to transform the light emitted by a component into a desired field distribution in free space. In this case, the distribution and polarization of the light is generally described by the vector mode field, which comprises both the spatial distribution of the vector electric field E(x,y) and the spatial distribution of the vector magnetic field H(x,y).

According to the prior art, discrete optical elements such as lenses, gradient-index fibers, curved mirrors or other refractive, diffractive or reflective optical elements are usually used to adjust the intensity distribution of the mode field. By contrast, polarization-manipulating optical elements, for example polarization filters or birefringent optical elements, inter alia half-wave or quarter-wave plates, or suitable optical fibers (e.g., polarization-maintaining optical fibers) are often used to set the orientation of the field vectors of the electric field and the magnetic field. These elements need to be suitably combined with one another in many practical applications, in particular in order to obtain a desired vector mode field distribution at the optical coupling point of an optical component part. Firstly, this leads to comparatively large arrangements, the installation space of which is often multiple times larger than that of the associated optical component part. Moreover, the individual discrete optical elements must be aligned very accurately with respect to one another and relative to the optical coupiing point of the optical component part. This often requires time-consuming and costly adjustment methods, in particular active adjustment methods, in which the optical coupling efficiency is continuously measured and optimized during the positioning procedure. Such adjustment methods are complex in application and only have qualified suitability for mass production of optical or micro-optical systems.

The problem arises in particular when light from the free space, from an optical fiber or from an optical component part is intended to be coupled into a certain mode, defined inter alia by the polarization direction, of a single mode waveguide of a further component. In the case of a waveguide that is homogeneous in the axial direction, that is to say a waveguide with an invariant cross-sectional profile in the propagation direction, the term "waveguide mode" denotes a form of the electromagnetic field which does not change its transverse spatial dependence during propagation in the axial direction. Waveguide modes may have a lower limit frequency, down to which the mode is guided in the respective waveguide while guidance is no longer possible for lower frequencies. A "fundamental mode" denotes a waveguide mode which has the lowest limit frequency in comparison with other modes of the same mode family, the mode family for example being determined by the polarization. In the case of step profile waveguides, the fundamental modes are generally distinguished in that the transverse intensity distribution belonging to the mode field has a single maximum in the region of the waveguide core, and in that otherwise there are no zeros in the transverse intensity distribution.

In many cases, guided waveguide modes can be subdivided into two different mode families on account of their polarization state, said mode families being referred to as "transverse electric" ("TE") or "transverse magnetic" ("TM") in particular. In this case, the field distribution with the lowest limit frequency can be determined for each of the mode families, and so two fundamental modes with different polarization states are present. Below, a "single mode waveguide" is understood to mean a waveguide for electromagnetic radiation in which at most two mutually orthogonal fundamental modes with different polarizations are able to propagate along the waveguide axis at the operating frequency. The terms "polarization" or "polarization direction" of a waveguide mode describe the orientation of the electric field vectors belonging to this waveguide mode, with the direction of a transverse component of the electric field, which dominates in many cases, often being used.

In the case of waveguides with cross sections that have continuous or discrete rotationally symmetric forms, e.g., round or square forms, degenerate or virtually degenerate waveguide modes often occur, these have the same or similar propagation constants and the mode fields thereof are able to be exactly or approximately converted into one another by way of an appropriate rotation. Additionally, in the case of degenerate or virtually degenerate modes, any linear combination of two mode fields will propagate with the same propagation constant as the initial modes in the axial direction and will in the process completely or approximately maintain its lateral field distribution. The polarization properties of a superposition of two degenerate or virtually degenerate waveguide modes can be described by an associated polarization state—in a manner similar to the superposition of plane waves in the free space.

When coupling various optical components among themselves or when these are linked to optical fibers, it is also possible for the case to occur, in particular, where light from a first single mode or multi-mode waveguide with two degenerate or virtually degenerate modes of different polarization has to be coupled into two further single mode or multi-mode waveguides with in each case non-degenerate eigenmodes, in such a way that only a respective eigenmode is excited in each of the two last-mentioned waveguides. By way of example, this is the case when coupling light from an optical fiber, for example a standard single mode fiber, with a rotationally symmetric cross-sectional profile and therefore degenerate modes of different polarization into fundamental modes, often referred to as TE or TM, of a strongly birefringent waveguide on an integrated-optical chip.

U.S. Pat. No. 7,127,131 B2 discloses an integrated-optical polarizing beam splitter which is produced on a plane semiconductor substrate using a planar microstructuring method from a plurality of layers referred to as "core layers" therein. The structure therefore not only requires a comparatively complex production process, which provides for processing of at least two layers with a high overlay accuracy, but also is subject to the restrictions of a structure geometry constructed from plane, often approximately prism-like partial structures with parallel base surfaces and top surfaces, in which the center lines of all waveguides or partial waveguides are located in a common plane or in mutually parallel planes. This restricts the functionality and for example leads to asymmetric losses of the two separated modes. Moreover, the component described therein is only suitable for separating two polarizations on an optical chip.

U.S. Pat. No. 7,228,015 B2 discloses an integrated-optical waveguide which causes a rotation of the polarization of the optical field propagating therein through 90°. It is likewise constructed from a plurality of discrete layers, referred to as "core layers", whereby the ideal form of an optical waveguide with a rectangular cross section that is twisted along its longitudinal axis can only be roughly approximated. It is therefore likewise subject to the restrictions of a structure geometry constructed from plane, approximately prism-like partial structures with parallel base surfaces and top surfaces, in which the center lines of all waveguides are located in a common plane or in mutually parallel planes. It further requires a complex production process which provides for processing of the individual layers by way of a repeated application of conventional microstructuring methods, in particular by using planar structured masks and anisotropic etching processes.

Watts et al., *Polarization splitting and rotating through adiabatic transitions, in Integrated Photonics Research*, A. Sawchuk, ed., Vol. 91 of OSA Trends in Optics and Photonics, 2003 describe an integrated-optical structure which combines the polarizing beam splitter disclosed in U.S. Pat. No. 7,127,131 B2 and the polarization rotating means disclosed in U.S. Pat. No. 7,228,015 B2. It is therefore substantially subject to the same restrictions as the associated partial structures. Production is implemented from a plurality of discrete layers, which are applied to a planar semiconductor substrate and which are processed using conventional planar microstructuring methods.

Schumann et al., *Hybrid 2D-3D optical devices for integrated optics by direct laser writing*, Light Science and Applications, Vol. 3, No. 6, 2014, disclose a polymer waveguide manufactured on the surface of a chip by 3-D lithography, said polymer waveguide having a twist along its longitudinal axis and thereby allowing a rotation of the polarization. The structure described therein is only used to interconnect two $Si_3N_4$ waveguides on the optical chip.

Hahn et al., *Polarizing beam splitter integrated onto an optical fiber facet*, Optics Express, Vol. 26, No. 25, 2018 describe a polarizing beam splitter manufactured on the facet of an optical fiber by 3-D lithography. The polarizing beam splitter comprises a lamellar grating with grating periods of the order of the vacuum wavelength of the utilized light, or with shorter grating periods, which is also referred to as a "sub-wavelength lamellar grating". In the laminar grating, radiated-in light with a polarization referred to as "TE" is coupled to a certain order of diffraction while another polarization, referred to as "TM", passes through the grating largely undisturbed.

WO 92/00185 A1 discloses the production of an optical waveguide by virtue of a light beam from a high-power laser being focused through a lens into a photostructurable material in order to achieve a photoinitiated polymerization of this material at the focus. A strand of polymerized material is produced along the path created by moving the focus through the photostructurable material, with the strand having a higher refractive index than the surrounding material body and being able to act as an optical waveguide. Optical waveguide devices comprising a multiplicity of waveguide strands can be produced using this method.

US 2018/0314005 A1 discloses a planar integrated polarizing beam splitter which comprises a waveguide core made of silicon nitride and which is configured to split an input light signal into two waveguide modes of different polarizations. However, this arrangement is a structure produced by planar microstructuring methods which, in relation to the free-form structures used in the present application, likewise has the restrictions described above in the context of U.S. Pat. No. 7,127,131 B2 and U.S. Pat. No. 7,228,015 B2.

U.S. Pat. No. 8,903,205 B2 and U.S. Pat. No. 9,034,222 B2 disclose a method and an arrangement for using optical free-form waveguides manufactured at a target position using 3-D lithography to interconnect different optical components. The fact that, in terms of position, form and size, the free-form waveguides can easily be adapted to the position, form and size of the optical component parts to be connected is exploited here.

OBJECT OF THE INVENTION

Proceeding therefrom, it is the object of the present invention to provide an arrangement for optical coupling and for mode-selective separation or superposition of optical fields, the use of the arrangement, and a method for producing a waveguide-based optical coupling element configured for mode-selective separation or superposition of optical fields, at an optical coupling point of an optical component, which at least partly overcome the disadvantages and limitations of the prior art.

In particular, the object of the present invention consists of using the arrangement and the method to couple light into an optical component part and/or to couple light between two or more optical component parts while at the same time adjusting a spatial mode field distribution and polarization. Further, in the reverse direction, the invention should allow light to be coupled out of an optical component part and should allow the provision of said light with a certain field distribution and polarization.

The arrangement should be as compact as possible and should also be able to be produced automatically in large numbers with as little outlay as possible. Further, the arrangement should let itself be aligned precisely in relation to facets of at least one component without this requiring a complicated adjustment method, in particular an active adjustment method, and without this making the manufacturing process for the optical component parts more difficult, in particular by virtue of being able to avoid the use of complex integrated-optical mode field converters or polarization converters.

The arrangement and the method should furthermore allow the separation of spatially overlapping but differently polarized field components of an input field and allow the supply of the separated field components to different, spatially non-overlapping optical waveguides; this function is comparable to that of a "polarizing beam splitter" in optical systems constructed from discrete components.

Further, in the reverse direction, the arrangement and the method should allow the combination of light from different, spatially non-overlapping optical waveguides and the superposition of this light in the form of differently polarized field components to form an output field; this function is tantamount to that of a "polarizing beam combiner".

In particular, the arrangement and the method are intended to allow an optical fiber with possibly degenerate eigenmodes with perpendicular polarization directions to be coupled to two integrated-optical waveguides in such a way that the light from the first of the two mutually orthogonal eigenmodes of the optical fiber can be transferred to a certain fundamental mode of the first integrated-optical waveguide while the light from the second of the mutually orthogonal eigenmodes of the optical fiber can be transferred to a fundamental mode of the second integrated-optical waveguide.

Further, reversal of the propagation direction should allow the superposition of the light from two spatially separated optical waveguides in the form of two mutually orthogonal eigenmodes of an optical fiber.

In this context, the arrangement should be flexibly applicable to a large variety of optical integration platforms and should make do where possible without additional discrete optical elements, with the associated method being intended to be inserted as seamlessly as possible into procedures from optical construction and connection technology.

DISCLOSURE OF THE INVENTION

This object is achieved by an arrangement for optical coupling and for mode-selective separation or superposition of optical fields, by the use of the arrangement, and by a method for producing a waveguide-based optical coupling element configured for mode-selective separation or superposition of optical fields at an optical coupling point of an optical component part, having the features of the independent patent claims. Advantageous developments, which are realizable individually or in any desired combination, are provided in the dependent claims.

The words "have," "include," or "comprise," or any desired grammatical deviations therefrom will be used below in a non-exclusive manner. Accordingly, these words can relate both to situations in which no further features in addition to the features introduced by those words are present, and to situations in which one or more further features are present. For example, the expression "A has B", "A includes B", or "A comprises B" can relate both to the situation in which no further element in addition to B is present in A (i.e., to a situation in which A consists only of B), and to the situation in which, in addition to B, one or more further elements are present in A, such as element C, elements C and D, or even further elements.

It should furthermore be pointed out that the expressions "at least one" and "one or more" and grammatical deviations of these expressions when used in connection with one or more elements or features, if said expressions are intended to express that the element or feature may be provided once or multiple times, are generally only used once, for example upon first introduction of the feature or element. If the feature or element is subsequently mentioned again, the corresponding term "at least one" or "one or more" is generally not used again, without limiting the possibility that the feature or element may be provided once or multiple times.

Furthermore, the words "by preference", "preferably," "in particular," "for example," or similar words are used below in connection with optional features without alternative embodiments being limited hereby. For example, features which are introduced by these words are optional features, and there is no intention of limiting the scope of the claims and in particular of the independent claims by these features. For example, the invention, as will be understood by a person skilled in the art, can also be performed using different configurations.

Similarly, features introduced by way of "in an embodiment of the invention" or by way of "in an exemplary embodiment of the invention" are understood to be optional features, without alternative configurations or the scope of the independent claims being intended to be limited hereby. Furthermore, these introducing expressions are not intended to touch upon all possibilities of combining the features introduced hereby with other features, be it optional or non-optional features.

In a first aspect, the present invention relates to an arrangement for optical coupling and for mode-selective separation or superposition of optical fields, the arrangement at least comprising:

- at least one waveguide-based optical coupling element having at least three optical coupling points,
  - at least one first optical coupling point having at least two differing guided eigenmodes assigned to the first optical coupling point,
  - at least one second optical coupling point having at least one guided eigenmode assigned to the second optical coupling point, and
  - at least one third optical coupling point having at least one guided eigenmode assigned to the third optical coupling point,
- at least one optical component part which has at least one further optical coupling point;
- wherein at least one of the optical coupling points of the waveguide-based optical coupiing element is optically connected to the at least one further optical coupling point of the optical component part, and
- wherein the waveguide-based optical coupling element is configured to highly efficiently bidirectionally transfer light
  - between at least one first guided eigenmode assigned to the first optical coupling point and the at least one guided eigenmode assigned to the second optical coupling point and
  - between at least one second guided eigenmode assigned to the first optical coupling point and the at least one guided eigenmode assigned to the third optical coupling point.

The terms "optical radiation", "radiation" or "light" relate to any type of electromagnetic waves that can be guided in a waveguide. In addition to the visible optical range, which has a vacuum wavelength $\lambda$ between 400 nm and 800 nm, this includes in particular the UV range of 1 nm$\leq\lambda\leq$400 nm, the infrared range of 800 nm$\leq\lambda\leq$1 mm and the microwave range of 1 mm$\leq\lambda\leq$1 m, with the range of 30 μm$\leq\lambda\leq$3 mm also being referred to as "THz range" and the range of 1 mm$\leq\lambda\leq$1 cm also being referred to as "millimeter wavelength range". Should nothing else be mentioned, numerical values specified below, especially for dimensions of structures or for describing performance indicators of microstructuring methods, e.g., for resolution or accuracy, relate to arrangements configured for a vacuum operating wavelength $\lambda$ of approximately 1.5 μm. For other operating wavelengths, the specified numerical values can be scaled proportionally to the wavelength, in particular with the refractive indices of the utilized materials being taken into account.

The terms "optical coupling point", "optical coupling structure" and "facet", furthermore used herein, in each case denote firstly an area of a light-emitting optical component or of a structure of the light-emitting optical component, which the light passes through last during an emission of said light and secondly the area of a light-receiving optical component or of a structure of the light-receiving optical component, on which light impinges first when said light is received.

Below, the terms "optical component part" and "optical component" denote an optical element configured to emit, transport, receive, detect and/or manipulate electromagnetic radiation, while the term "optical system" denotes an arrangement of at least two optical components or a combination of one or more arrangements according to the invention, among themselves, with at least one optical component or with at least one further additional structure produced in combination with the arrangement according to the invention, in particular at least one optical waveguide or at least one micro-optical element. Preferably, each optical component used within the scope of the present invention is selected from the group comprising: optical fibers, in particular single mode fibers or multi-mode fibers made of organic or inorganic materials; semiconductor-based integrated-optical chips, in particular photodiodes, linear or planar photodiode arrays, CCD arrays or image sensors, in particular on the basis of semiconductors, preferably silicon or III-V compound semiconductors, or dielectric materials, preferably glasses, silicon dioxide, silicon nitride or polymers; bolometers; lasers, in particular vertical cavity surface emitting lasers (VCSELs) or edge-emitting lasers; superluminescent diodes; optical circuit boards; elements for free beam optics, in particular lenses, beam splitters, isolators, mirrors or diffraction gratings. Other optical components are conceivable. The optical components may preferably comprise optical waveguides with a low index contrast, in particular glass-based optical waveguides, or waveguides with medium or high index contrast, in particular semiconductor-based waveguides. Input coupling or output coupling of light can preferably occur at an edge or on a surface of the optical component; in particular, at an edge of an edge-emitting laser, at a chip edge, or at a facet of a waveguide-based system; alternatively, at a surface of a surface emitting laser or a surfaceilluminated photodiode, or on the surface of a waveguide-based chip which comprises at least one optical coupling point, in particular selected from a grating coupler or a deflection mirror. However, other methods of input coupling or output coupling light are possible.

For low-loss coupling of light into an optical coupling point of an optical component, the light is preferably radiated into the optical coupling point at a defined position and with a defined direction such that the light has a defined field distribution. Conversely, an optical coupling point radiates light into a defined direction with a defined field distribution at a defined position. In this context, the terms "vector field distribution" or "field distribution" is understood to mean a combination of complex vector electric fields (E fields) and magnetic fields (H fields), which define both an intensity distribution and the polarization of the electromagnetic field, with the "polarization" referring to an orientation of the corresponding field vectors. The term "orthogonality" of field distributions, furthermore used, relates to orthogonality relations usually used in integrated optics; see, e.g., Katsunari Okamoto, *Fundamentals of Optical Waveguides*, Academic Press, 2006, pp. 154-155.

The terms "mode field" and "mode field distribution" which denote the vector field distribution of a waveguide mode associated with the waveguide cross section are used for field distributions linked to optical waveguides. As already mentioned, the terms "waveguide mode", "eigenmode" or simply "mode" in the case of a waveguide that is a homogenous in the axial direction denote an electromagnetic field form which does not change its transverse spatial dependence in the case of propagation in the axial direction. In the case of more complex waveguides, whose cross-sectional profile changes, e.g., periodically, in the axial direction, the associated mode field may also change accordingly periodically. Waveguides whose cross-sectional profile changes sufficiently slowly, that is to say changes adiabatically, in the axial direction can often be described to a good approximation on the basis of correspondingly slowly changing, i.e., adiabatically changing, mode fields.

The present arrangement for optical coupling and for mode-selective separation or superposition of optical fields comprises a waveguide-based optical coupling element which is also referred to simply as "optical coupling element" and which allows light to be coupled into an optical component part and/or transferred between at least two optical component parts while the spatial mode field distribution and polarization are adjusted at the same time. In relation to the optical coupling element, the term "waveguide-based" in this case describes a structure in which light is guided at least sectionally by waveguides configured to this end. To this end, in principle, the waveguide-based optical coupling element can be realized on the basis of any waveguide concept. Dielectric waveguides are preferably suitable to this end; alternatively, use can be made of metallic waveguides, in particular hollow waveguides for the microwave range, or plasmonic structures.

Consequently, the waveguide-based optical coupling element is firstly suitable for splitting a superposition of at least two mutually orthogonal or virtually orthogonal field distributions present at a first optical coupling point of the optical coupling element and for simultaneously manipulating the associated spatial field distribution and/or polarization. Secondly, the waveguide-based optical coupling element can serve to manipulate optical signals, radiated in at at least two spatially separated optical coupling points, in relation to their field distribution and/or polarization, to superpose the radiated-in optical signals in the form of spatially overlapping partial fields of different modes and to then provide the superposition of the partial fields at at least one output coupling point.

Moreover, it is possible to use the waveguide-based optical coupling element as a polarization filter. To this end, the optical signal to be filtered in relation to the polarization can be coupled into the optical coupling element via a first optical coupling point. The desired signal filtered in relation to the polarization is then available in one of the guided eigenmodes of a second optical coupling point or a third optical coupling point, while the signal component to be suppressed by the polarization filtering is supplied to a termination element connected to the respective other optical coupling point. A termination element or beamdump is understood to mean a structure that receives and absorbs incident light without noteworthy back reflection, or radiates said light into surroundings such that there is no renewed coupling into the waveguide-based optical coupling element or one of the optical component parts connected thereto. The power levels of the back reflection at the input of the beamdump preferably are at least 10 dB, particularly preferably at least 20 dB or 30 dB, below the incident power. In a preferred embodiment, the beamdump can be implemented in form of a continuously tapering taper structure, whereby the light can be emitted in the direction of an absorbing surface in particular. Coupling to an optical component can be implemented either directly or, as described above, via at least one connecting waveguide or at least one free beam coupling stretch.

The waveguide-based optical coupling element can be produced in situ at an optical coupling point of an optical component part or between at least two optical coupling points of at least one optical component part by way of a three-dimensional free-form microstructuring method and, in the process, can be adjusted in particular in terms of position, form and/or size to the position of the one optical component part or the at least two optical component parts. In the explanations given below, the at least two spatially overlapping, orthogonal or virtually orthogonal field distributions fed-in or emitted at the first optical coupling point of the optical coupling element are interpreted as a matter of principle as fundamental modes of different polarizations; the associated arrangement then fulfills the function of a polarizing beam splitter or a polarizing beam combiner. The term “mode-selective” denotes the fact that the arrangement according to the invention can be used to separate any modes, in particular also two modes with the same polarization but different field distributions, as a result of appropriate adjustments of the design of the waveguide-based optical coupling element.

What can be exploited to separate the modes is that these are guided with different strengths in suitably formed waveguides and that consequently a separation can be achieved by a geometric divergence of the waveguides. In this context, a “strongly guided” mode of a waveguide is understood to mean a waveguide mode which has a substantially greater propagation constant and hence has a substantially greater effective refractive index than other modes guided in this waveguide, which are accordingly referred to as “weakly guided”. In particular, strongly guided modes are distinguished by virtue of the fact that they adjust substantially more strongly to changes in the waveguide trajectory and/or in the waveguide cross section along the propagation direction, e.g., to a twist or to changes in the diameter, than weakly guided modes. Cases in which only a strongly guided mode exists in a waveguide are also conceivable. In many cases, a strongly guided waveguide mode is a fundamental mode whose electric field is predominantly polarized along a direction, in which the waveguide core has its maximum extent.

As an alternative to the separation of modes by geometrically divergent waveguides, configurations are conceivable in which differently strong couplings of the modes to be separated to waveguides running in parallel are used, in a manner similar to what are known as “directional couplers”. A further option consists of the targeted conversion of modes by a periodic modulation of the waveguide cross section in the axial direction, with the fundamental wavenumber of this modulation corresponding to the difference in the wavenumbers of the modes to be coupled. Hence, any desired modes can be converted into field forms which can be separated from one another in particularly low-loss and reliable fashion. A potential field of use in this case is preferably the separation of modes at the facet of a multimode fiber or a so-called “few-mode fiber” and the input coupling of the corresponding optical signals into different optical coupling points of an optical component part. The configurations of the coupling element preferred to this end can be determined, inter alia, by what are known as “topology optimization methods”, in which it is possible to numerically optimize not individual geometry parameters but the entire form of the optical coupling element. The structured geometries obtained thereby elude a generally valid description but likewise facilitate the embodiment of the arrangement according to the invention for optical coupling and mode separation.

For further details in relation to the proposed arrangement, reference is made to the exemplary embodiments below.

In a further aspect, the present invention relates to a method for producing a waveguide-based optical coupling element configured for mode-selective separation or superposition of optical fields at an optical coupling point of an optical component part. In detail, the steps of the method are as follows:

a) providing at least one optical component part and localizing at least one further optical coupling point of the at least one optical component part in a coordinate system in a free-form microstructuring unit configured to carry out a free-form microstructuring method;
b) generating a data set which describes a three-dimensional form of the waveguide-based optical coupling element in the coordinate system of the microstructuring unit, wherein
   the waveguide-based optical coupling element has at least three optical coupling points,
      at least one first optical coupling point having at least two differing guided eigenmodes assigned to the first optical coupling point,
      at least one second optical coupling point having at least one guided eigenmode assigned to the second optical coupling point, and
      at least one third optical coupling point having at least one guided eigenmode assigned to the third optical coupling point,
   wherein the waveguide-based optical coupling element is configured to highly efficiently bidirectionally transfer light
      between at least one first guided eigenmode assigned to the first optical coupiing point and the at least one guided eigenmode assigned to the second optical coupling point and
      between at least one second guided eigenmode assigned to the first optical coupling point and the at least one guided eigenmode assigned to the third optical coupling point;
c) producing the waveguide-based optical coupling element at the at least one further optical coupling point of the at least one optical component part by using the free-form microstructuring method.

The implementation of steps a) to c) need not be carried out strictly sequentially but may also be included in other manufacturing processes running in parallel. In this case, each of steps a) to c) may also be carried out multiple times and at least successive steps may also be at least partly carried out in parallel. Moreover, further steps, in particular step d) listed below, may be carried out additionally. In particular, the data set generated in step b) may also contain simple connecting waveguides or micro-optical elements such as lenses or mirrors in addition to the waveguide-based optical coupling element for mode-selective separation or superposition of optical fields, the design of which simple connecting waveguides or micro-optical elements is likewise based on the position and orientation of certain optical coupling points, and these can be produced together with the waveguide-based optical coupling element in accordance with step c). Further, the basic structure of the waveguide-based optical coupling element generated in step c) may be subject to further, subsequent post-processing steps, within the scope of which the generated basic structure may for example be locally or globally embedded in optically low-refractive-index cladding materials or be provided with a vapor-deposited coating. By way of example, dispensing or printing methods or microstructuring methods similar to the method used in step c) can be used for the local application of corresponding cladding materials. A corresponding data set may also contain simple connecting waveguides or micro-optical elements such as lenses or mirrors in addition to the waveguide-based optical coupling element for mode-selective separation or superposition of optical fields, the design of which simple connecting waveguides or micro-optical elements is likewise based on the position and orientation of certain optical coupling points, and these can be produced together with the waveguide-based optical coupling element in step c).

In a preferred configuration of the present method, subsequent step d) can be carried out, preferably following step c):

- d) embedding the waveguide-based optical coupling element at least regionally in a cladding region adjoining the optical waveguide-based coupling element as core region, the core region having a refractive index of 1.3 to 1.8 and a refractive index difference of 0.05 to 0.7 occurring between the core region and the cladding region.

The arrangement is preferably manufactured in situ, that is to say directly at the target position, by using a microstructuring method configured to this end. In this case, the utilized term "microstructuring method" relates to a subtractive or additive manufacturing method, whereby three-dimensional structures, preferably free-form structures, can be produced with dimensions, depending on the operating wavelength of the described structure, in the micrometer range and/or millimeter range. A microstructuring method configured for the production of free-form structures is referred to as a "free-form microstructuring method" below. A "free form" or "free-form structure" is understood to mean a structure which at least regionally may have surfaces with any desired curvature, within the scope of technical limitations in relation to resolution and accuracy. Hence, a free-form structure differs in particular from structure geometries which can be produced on planar semiconductor substrates by conventional planar microstructuring methods, for example by a combination of thin film deposition methods, two-dimensional lithography methods such as projection lithography, and etching processes. As a rule, a combination of these conventional planar microstructuring methods leads to prism-like three-dimensional structure geometries which each have a top surface and a base surface substantially parallel to the substrate surface, said base surface and top surface being identical or very similar in terms of their form and being interconnected by side walls which are perpendicular, inclined or inwardly or outwardly arched in relation to the substrate surface, depending on the respective etching process or deposition process. In this case, the form of the base surface and the top surface is substantially specified by the mask used for local etching or deposition, said mask often being lithographically structured. Multilayer structures consisting of a plurality of prism-like partial structures can be constructed by multiple repetition of the etching or deposition process with different masks; the additional outlay connected with the repetition is enormous and the structure quality obtained is in many cases also restricted by the overlay accuracy, and so the number of layers is often restricted to a few in practice, for example three. This leads to geometric limitations of the structures producible with justifiable outlay using conventional microstructuring methods, and hence leads to functional restrictions of the components formed thereby. The additional outlay connected with the multi-layered structuring is very high in many cases and makes the production processes of the associated optical components much more complicated, especially if the associated additional layers cannot also be used for other component parts present on the chip.

In contrast thereto, free-form structures produced by free-form microstructuring methods are not subjected to these restrictions, or not subjected to these restrictions to the same extent, since their structure geometry is not limited to a combination of a comparatively small number of plane, prism-like partial structures. This makes it possible, in particular, to generate waveguide-based optical coupling elements with non-planar structures, in the case of which the center lines of the waveguides forming the coupling element need not lie in a common plane or in mutually parallel planes. It should be observed in this context that free-form structures are also produced in many cases from a multiplicity of individual layers, for example by using a multilayer material application within the scope of 3-D printing or by curing various layers in the case of 3-D lithography methods. However, within the scope of a justifiable production outlay, free-form microstructuring methods allow the number of layers to be chosen to be so large that this yields a good approximation of the free-form structure and that the discretization into individual layers no longer represents any practical functionally relevant limitation of the producible structure geometries.

In this case, the waveguide-based optical coupling element is preferably constructed from at least 6, particularly preferably from at least 10, and in particular from at least 20 or 30 layers. In this context, the thickness of a layer preferably ranges between 10 nm and 1000 nm, particularly preferably between 30 nm and 500 nm, in particular between 50 nm and 300 nm. The free-form microstructuring method used to this end allows the production of free-form structures with an accuracy of preferably better than 1000 m, particularly preferably better than 500 nm, in particular better than 100 nm. The resolution of the free-form microstructuring method is preferably better than 3 μm, particularly preferably better than 1 μm, in particular better than 500 nm. In this case, the listed values in each case relate to the production of free-form structures which are provided for a vacuum operating wavelength of approximately 1.5 μm; the dimensions of the free-form structures and hence the requirements in respect of accuracy and resolution of the free-form microstructuring method used for production purposes can be scaled for other operating wavelengths, in particular with the refractive indices of the utilized materials being taken into account.

In contrast thereto, WO 92/00185 A1 discloses waveguide-based optical arrangements in which a local increase in the refractive index of a photostructurable material is obtained purely by way of lithographic irradiation. In contrast to the present application, the method described in WO 92/00185 A1 does not provide for a development step in particular, within the scope of which the unexposed regions are selectively removed and replaced by a lowrefractive-index cladding material. Hence, the achievable refractive index difference is typically restricted to values below 0.025, which makes a production of compact polarization-sensitive structures significantly more difficult. In particular, a production of a waveguide-based polarizing beam splitter comprising two overlaid partial waveguides does not appear implementable according to WO 92/00185 A1; the two orthogonally polarized eigenmodes of the partial waveguides have practically identical effective refractive indices on account of the small index contrast and are consequently guided with equal strength. A separation of the orthogonally polarized eigenmodes by diverging the partial waveguides therefore does not appear possible if practically realizable component part lengths are maintained.

In a preferred configuration, the free-form microstructuring method and/or a free-form microstructuring unit facilitating such a method may be based on a lithographic method, which in particular uses stereolithography or direct writing lithography methods, preferably three-dimensional direct writing lithography methods. In this case, additive or subtractive manufacturing methods can be used, with the term "additive manufacturing method" denoting a production method in which material is continuously applied to or on a structure while the term "subtractive manufacturing method" describes an alternative production method in which material is removed from a structure. In the preferred embodiment, material application or material ablation can be achieved by lithographic methods using suitable photoresists, in particular negative or positive resists. In this case, spatial light modulators which allow fast patterning can be used in the stereolithography methods in a preferred configuration. In a preferred configuration, multi-photon lithography methods can be used as direct writing lithography methods, in particular by using pulsed laser sources. In this case, use can be made of light pulses with a pulse duration of preferably no more than 10 μs, preferably no more than 1 μs, particularly preferably no more than 200 fs, in particular no more than 100 fs in the case of a repetition rate of preferably at least 1 MHz, preferably 10 MHz, particularly preferably at least 25 MHz, in particular at least 100 MHz. Suitable to this end are, in particular, laser light sources selected from fiber-based femtosecond lasers or pulsed solid-state lasers such as titanium:sapphire lasers or diode lasers, which can be combined with frequency conversion units, for example for frequency multiplication, for the summation frequency generation or for the difference frequency generation. Depending on the utilized lithography method, preferential use can be made in the process of wavelengths in the near infrared, visible or ultraviolet spectral range or in the range of extreme UV (EUV) radiation or in the range of x-ray wavelengths. Wavelengths from 150 nm to 1700 nm, in particular from 300 nm to 1100 nm, are used in the particularly preferred embodiment. In the case of pulsed lasers, two-photon, three-photon or multi-photon absorption effects can be achieved in a targeted manner by a suitable choice of pulse duration and pulse energy. Diode lasers with emission wavelengths from 360 nm to 550 nm, that is to say for example around 365 nm, 385 nm, 405 nm, 550 nm and 532 nm, lend themselves in the case of lithography methods using continuous wave lasers based on single photon absorption. To increase the resolution of lithography methods, "stimulated emission depletion" (STED) can be used with suitable photoinitiators, in the style of corresponding microscopy methods. Moreover, furthey microstructuring methods for producing the waveguide-based optical coupling element are conceivable, in particular methods that may be based on material extrusion, powder-bed fusion, material jetting, binder jetting, selective laser sintering or electron-beam melting. Methods such as metal printing or laser deposition welding can be used, for example, for the production of hollow waveguides in the micrometer and millimeter wavelength range. Depending on the respectively employed microstructuring method, the waveguide-based optical coupling element may comprise a polymer, preferably an optically additively or subtractively structurable acrylate, epoxy resin, or a fluoropolymer, a metal or a metal-coated dielectric. In a preferred configuration, the waveguide-based coupling element may comprise a different material to that of the optical component part. To produce the structures, it may be advantageous to carry out further post-processing steps, within the scope of which the produced structures can be locally or globally embedded in optically low-refractive-index cladding materials or can be provided with a vapor-deposited coating.

The use of a free-form microstructuring method in particular renders it possible to produce structures with symmetric or virtually symmetric geometries, which preferably may have very similar losses for the two separated modes. In this context, a "virtually symmetric structure geometry" is understood to mean a three-dimensional form with a plane of symmetry, axis of symmetry or a point of symmetry, wherein a perfect symmetry may be slightly impaired by adjustments to the structure geometry which are used in particular for coupling the waveguide-based optical coupling element to positions and directions of at least one optical coupling point assigned to at least one optical coupling element to be linked, as described below. The differences in the power losses for the two separated modes are preferably less than 3 dB, particularly preferably less than 2 dB, in particular less than 1 dB or 0.5 dB.

In general, extinction ratios of preferably better than 6 dB, particularly preferably better than 10 dB, in particular better than 15 dB or 20 dB can be achieved at the output coupling points when the arrangement according to the invention is used as a polarizing beam splitter. In this case, the "extinction ratio" is understood to mean a quotient of the luminous power in the mode that is wanted at the output coupling point to the luminous power in the respective unwanted mode, with the quotient frequently being expressed in decibel (dB) by way of a logarithmic conversion. In this case, the relative optical bandwidth of the structure can preferably be greater than 1%, particularly preferably greater than 5%, in particular greater than 10% or 20%. Here, the "relative optical bandwidth" is understood to mean a ratio of the width of the frequency range, over which the optical component part reaches the demanded power indicator, to the respective mid-frequency.

A further advantage of the proposed arrangement lies in the fact that the in situ production, preferably with the aid of additional connecting waveguides, allows said arrangement to be coupled with very low losses to one or more optical coupling points of one or more optical component parts, without the optical component parts having to be aligned with great precision in complicated adjustment methods. Proceeding from the already fixed optical component parts, the spatial position and direction of the optical coupling points belonging to these optical component parts can to this end be acquired in a first step of the production method and can be taken into account when designing the optical coupling element and the preferably present additional structures such as connecting waveguides. This allows inaccuracies in the positioning of the optical component parts to be compensated by a corresponding adjustment of the form of the claimed arrangement by virtue of the design of the optical coupling element and optionally present additional structures being chosen in such a way that the light is made available or received at the optical coupling points of the waveguide-based optical coupling elements and/or at the assigned optical coupling points of the adjoining additional structures, for example connecting waveguides, with the necessary position and propagation direction and hence a high efficiency of the coupling to the optical coupling points of the optical component parts and/or to the waveguide modes defined by the optical coupling points is achieved.

By adjusting the waveguide-based optical coupling elements to the positions and directions of the optical coupling points of the optical components to be linked, it is possible to compensate positioning inaccuracies of the optical component parts to be linked such that it is possible to dispense with a highly accurate alignment of these component parts. To adapt the waveguide-based optical coupling element to the positions and directions of the optical coupling points of the optical component parts to be linked, it is preferably possible to vary geometric parameters of the optical coupling element, in particular a length of a first waveguide section, which is described below, and/or a precise trajectory of the partial waveguides. As an alternative or in addition, additional connecting waveguides or beam-shaping elements, which have practically any desired 3-D geometry, can be connected to selected optical coupling points of the optical coupling element and/or of the optical component parts to be linked, said additional connecting waveguides or beam-shaping elements being able to produced together with the optical coupling element without great additional outlay by way of a free-form microstructuring method and allowing inaccuracies in the positioning of the optical components parts to be linked to be compensated.

In a preferred configuration, the free-form microstructuring method can be configured to also produce what are known as "photonic wirebonds", as disclosed in, e.g., U.S. Pat. No. 8,903,205 B2 or WO 2018/083191 A1, in addition to the waveguide-based coupling element, preferably within the scope of a common production step. Other methods, for example three-dimensional printing processes, are likewise conceivable, especially if the intention is to produce comparatively large structures for operation at frequencies in the micrometer and millimeter wavelength range.

In respect of further details in relation to the present method, reference is made to the description of the arrangement and to exemplary embodiments.

BRIEF DESCRIPTION OF THE FIGURES

Further details and features of the present invention are apparent from the following description of preferred exemplary embodiments, in particular in connection with the dependent claims. Here, the respective features can be implemented by themselves, or a plurality thereof can be implemented together in combination. The invention is not limited to the exemplary embodiments. The exemplary embodiments are illustrated schematically in the following figures. Identical reference numerals in the figures refer to identical or functionally identical elements or to elements which correspond to one another in terms of their functions. Specifically:

DESCRIPTION OF THE EXEMPLARY EMBODIMENTS

Figure 1:
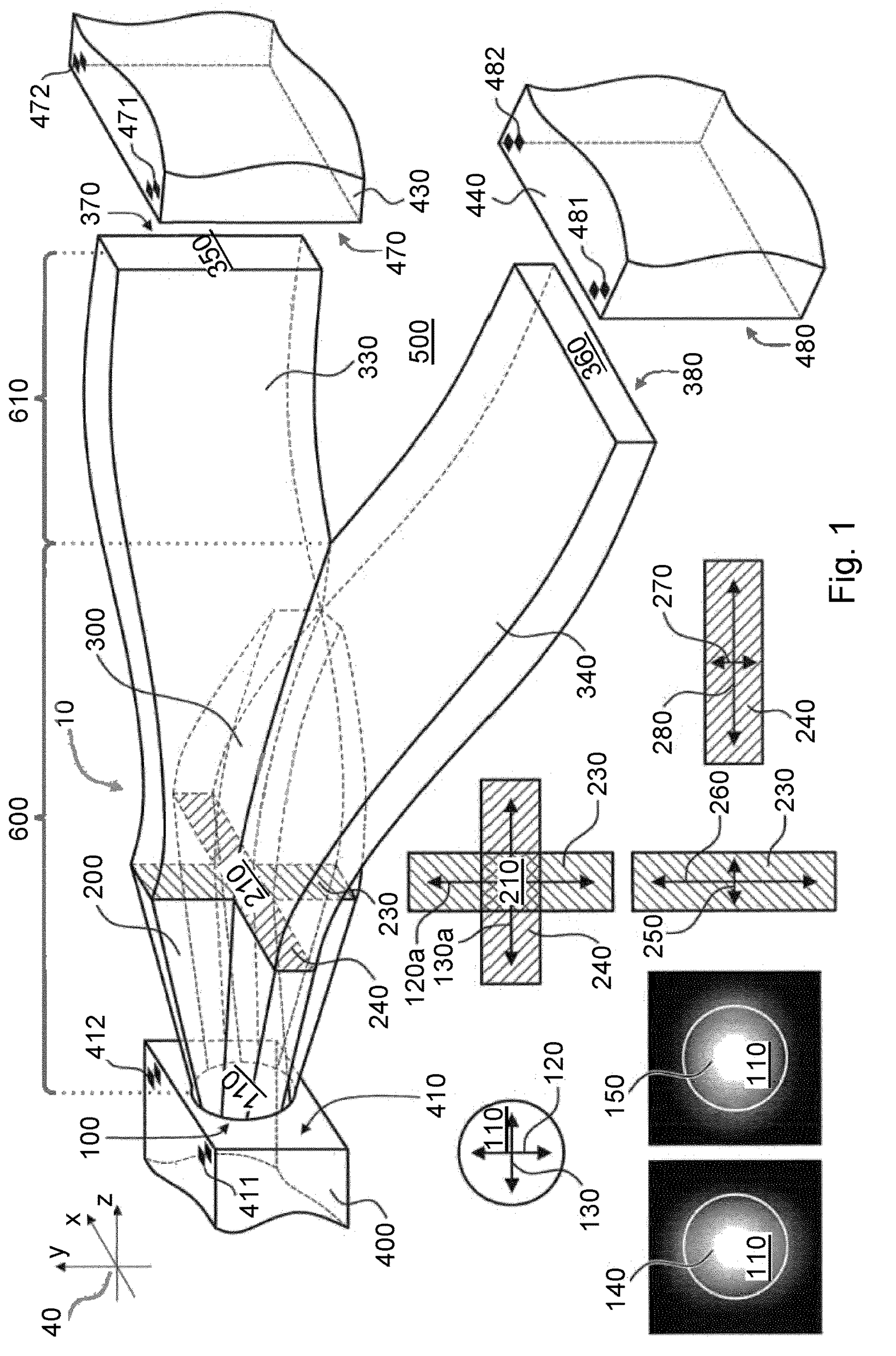
FIGS. 1 to 11 each show a schematic representation of a preferred exemplary embodiment of the arrangement according to the invention for optical coupling and for mode-selective separation or superposition of optical fields.

FIG. 1 shows a schematic representation of a preferred exemplary embodiment of the arrangement according to the invention for optical coupling and for mode-selective separation or superposition of optical fields. To elucidate the functionality of a polarizing beam splitter or a polarizing beam combiner, the exemplary embodiment shows the arrangement according to the invention comprising a waveguide-based optical coupling element 10 which is connected to an optical component part 400 with a first optical coupling point 100. In the subsequent illustration, the propagation of light is implemented from a first optical coupling point 100 that serves as an input coupling point to a second optical coupling point 370 and a third optical coupling point 380 which serve as output coupling points, in order thus to facilitate a use of the waveguide-based optical coupling element 10 as a polarizing beam splitter. In this case, the distinction between "input coupling point" and "output coupling point" only serves for a simpler description of the arrangement and should not be construed as a restriction in respect of the functionality of the component part. Rather, the light path can be reversed, as a result of which there is an interchange between the role of "input" and "output" and the use of the arrangement as a polarizing beam combiner is rendered possible.

In the embodiment illustrated, the waveguide-based optical coupling element 10 schematically represented in FIG. 1 comprises a first waveguide section 200, which has a first waveguide cross section 110 and a first optical coupling point 100, which serves as input coupling point in the case of the polarization beam splitter. The first waveguide cross section 110 present at the first optical coupling point 100 has two mutually orthogonal, possibly degenerate eigenmodes 120, 130, which are assigned to the first optical coupling point 100 and which each have for example an electric mode field with dominating, linearly polarized transverse components of the E-field vector and whose intensity distributions 140, 150 may be very similar and have a significant overlap. In the case of dominating, transverse polarization components in the two mutually orthogonal mode fields, the associated transverse E-field vectors of the transverse components are substantially perpendicular to one another; the separation of the mode fields then, to a good approximation, is tantamount to a separation of the associated linear polarizations.

The waveguide-based optical coupling element 10 schematically represented in FIG. 1 further comprises a second, branching waveguide section 300 which adjoins the first waveguide section 200 and which comprises two spatially intersecting partial waveguides 330, 340 which, when considered individually, each have at least two eigenmodes with different polarization directions and very different effective refractive indices, and so a coupling between the waveguide modes is only very weakly pronounced during the propagation. In principle, modes of the same waveguide that have very different effective refractive indices are also referred to as "strongly decoupled modes". In this case, the difference in the effective refractive indices of the two modes is preferably more than 0.005, particularly preferably more than 0.05, and very particularly preferably more than 0.1. Embodiments in which only one guided eigenmode, which is generally polarized along the longer extent of the waveguide cross section, is present in each of the at least one partial waveguides 330, 340 are also conceivable. The partial waveguides 330, 340 define the two further optical coupling points 370, 380 with associated cross sections 350, 360. The two further optical coupling points 370, 380 are used as an output in the case of a polarizing beam splitter, that is to say the two orthogonal first eigenmodes 120, 130, assigned to the first optical coupling point 100, of the first waveguide cross section 110 acting as input are in each case assigned to a respective waveguide mode of the two partial waveguides 330, 340 acting as an output waveguide, while the respective other waveguide mode of the respective partial waveguide 330, 340 acting as an output waveguide is not excited apart from unwanted cross talk.

The functionality of the arrangement sketched out in FIG. 1 is based, in particular, on the fact that, in the first waveguide section 200, the first waveguide cross section 110 is continuously converted to a waveguide cross section 210 comprising a superposition of two waveguide cross sections 230, 240, with the second waveguide cross sections 230, 240 each having further eigenmodes 250, 260; 270, 280 with very different effective refractive indices. This continuous conversion of the first waveguide cross section 110 to the second waveguide cross section 210 can in the process preferably be designed so that there is a continuous deformation of the cross section of the waveguide-based optical coupling element 10 along the propagation direction of the light. The first waveguide region 200 preferably has a length of 0.1λ, to 30λ, particularly preferably from 0.2λ, to 15λ, in particular from 0.2λ, to 10λ, while the length of the entire waveguide-based optical coupling element 10, as measured along its greatest extent, is preferably less than 50λ, particularly preferably less than 25λ, in particular less than 10λ, where λ denotes the vacuum wavelength of the utilized light, with a refractive index of approximately 1.5 being assumed for the utilized material.

In terms of form and size, the waveguide cross sections 230, 240 are adapted to the cross sections of the partial waveguides 330, 340 which the latter have at the interface between the first waveguide section 200 and the second waveguide section 300. Unlike what is sketched in FIG. 1, it is not necessary for the waveguide cross sections 230, 240 to be precisely identical with the cross sections of the partial waveguides 330, 340 at the interface containing the waveguide cross section 210 between the first waveguide section 200 and the second waveguide section 300. Rather, it is sufficient to adapt the cross sections to one another in such a way that there is the best possible optical coupling between the first waveguide section 200 and the second waveguide section 300. Further, the cross sections of the various partial waveguides schematically sketched out as rectangular in FIG. 1 should be understood to be exemplary; a person skilled in the art may also consider the use of other forms, for example elliptical forms, which may under certain circumstances be found to be more robust in relation to manufacturing inaccuracies.

As is further illustrated schematically in FIG. 1, the initially superposed waveguide cross sections 230, 240 of the partial waveguides 330, 340 are made to continuously diverge into the spatially disjoint output waveguide cross sections 350, 360 within the second waveguide section 300. In this case, divergence can be implemented in such a way that the change of a structure cross section in the axial direction is implemented sufficiently slowly in order to facilitate an adiabatic transition of the mode fields and hence a spatial separation that is as disturbance free and as low loss as possible. Within this separation, use can be made of the circumstance that the strongly guided modes of the two partial waveguides 330, 340 follow the trajectory of the respective partial waveguide and, in the process, hardly couple to weakly guided modes and are also not emitted to any noteworthy extent. This renders it possible to initially convert optical signals present in the first two orthogonal eigenmodes 120, 130 of the first optical coupling point 100 that serves as input into first mode fields 120*a*, 130*a* in a plane of the waveguide cross section 210 and to then assign, with low losses and little cross talk, the first mode fields 120*a*, 130*a* to a respective fundamental mode of the two further optical coupling points 370, 380 considered as the output.

In the case where the initial cross sections 230, 240 of the partial waveguides 330, 340 are rectangular, as shown in FIG. 1, an embodiment in which the effective refractive index nel of the strongly guided fundamental mode polarized along the longer side of the rectangular cross section 230, 240 in each case exceeds the effective refractive index nee of the weakly guided fundamental mode polarized along the shorter side of the rectangular cross-sectional profile by preferably more than 0.005, particularly preferably by more than 0.05, in particular by more than 0.1 is preferably sought after. By way of example, this can be achieved by virtue of the fact that highly elongate cross sections, for example elliptical or rectangular cross sections with a large aspect ratio, are used for the partial waveguides 330, 340. The "aspect ratio" of a waveguide cross section represented by a planar figure is understood in this case to mean the greatest possible ratio of two extents, measured in mutually orthogonal directions, of this figure. The aspect ratio is tantamount to the side ratio in the case of rectangular cross-sectional figures and to the ratio of the semi-axes in the case of elliptical cross-sectional figures. Depending on the respectively chosen waveguide materials, the aspect ratio of the cross sections of the partial waveguides 330, 340 is preferably more than 1.5, particularly preferably more than 2.5, in particular more than 3.5 or 4.5, at least in delimited sections. Moreover, a large refractive index difference between a high-refractive-index core region and a low-refractive-index cladding region of the waveguide-based optical coupling element 10 is advantageous for dielectric waveguides, for the purposes of obtaining large differences in the effective refractive indices of the strongly and weakly guided modes.

For the waveguide-based optical coupling element 10 whose core region is preferably produced by lithographic patterning of polymer materials, the refractive index in the core region is preferably between 1.2 and 2, particularly preferably between 1.3 and 1.8, in particular between 1.4 and 1.7. The refractive index in the cladding region is preferably between 1.0 and 1.5, particularly preferably between 1.0 and 1.45. Hence, the refractive index difference between the core region and the cladding region is preferably between 0.05 and 0.7, particularly preferably between 0.1 and 0.7, in particular between 0.15 and 0.6. Where necessary, the refractive index difference can be set by using a suitable capping material or cladding material 500, into which the core region of the waveguide-based optical coupling element is fully or partially embedded, wherein, in a subsequent method step, the capping material or the cladding material 500 is preferably able to be applied locally or globally on the core region of the waveguide-based optical coupling element 10 produced by using the free-form microstructuring method. In the case of polymer-based core regions, low-refractive-index polymers which in particular may be fluorinated or else may have polysiloxane-based components preferably lend themselves as cladding materials 500. The refractive index of the cladding material 500 that at least regionally surrounds the waveguide core is preferably from 1.2 to 1.5, in particular from 1.3 to 1.45.

Consequently, in this arrangement, the light is able to be coupled into the optical coupling element 10 via the first waveguide cross section 110 referred to as "input facet" and is able to be coupled out of the waveguide-based optical coupling element 10 again via the waveguide cross sections 350, 360 referred to as "output facets"; in this case, the waveguide-based optical coupling element 10 is used as polarizing beam splitter. This light path can also be reversed such that the roles of input and output facets are accordingly interchanged. As a result, the waveguide-based optical coupling element 10 can also be used for combining two optical signals which are each coupled into a respective eigenmode of the two further, spatially separated optical coupling points 370, 380 and which are transferred to mutually orthogonal eigenmodes of the first optical coupling point 100. As a result, the waveguide-based optical coupling element 10 can also be used as a polarizing beam combiner.

Using the waveguide-based optical coupling element 10, it is possible to spatially separate two spatially overlapping eigenmodes 120, 130 assigned to the first optical coupling point 100, which eigenmodes are present at the first optical coupling point 100 and which are mutually orthogonally or virtually orthogonal, and to optionally subject said eigenmodes to a further manipulation of the eigenmodes 260, 280 assigned to the second optical coupling point 370 and the third optical coupling point 380. As a result of this separation and the optional further manipulation, it is preferably possible to determine the powers and/or amplitudes and phases originally present in the eigenmodes 120, 130 assigned to the first optical coupling point 100 by using a method configured to this end, in particular a coherent detection method, and hence possible to determine the associated polarization state. To this end, the initially separated eigenmodes 120, 130 assigned to the first optical coupling point 100 can preferably be brought to interference with one another and/or with additional reference fields. Further, the spatially separated eigenmodes 260, 280 assigned to the second optical coupling point 370 and the third optical coupling point 380 can preferably also be manipulated such that each of the modes is configured to excite an eigenmode of a component part or waveguide 430, 440 adjoining the waveguide-based optical coupling element 10 via the two further optical coupling points 370, 380 configured as output coupling points. In the case of a component part 400 connected on the input side to the first optical coupling point 100, it is consequently possible to split the associated degenerate or non-degenerate eigenmodes 120, 130 of the optical component part 400 assigned to the first optical coupling point 100 and hence couple these into two integrated-optical component parts or waveguides 430, 440 connected to the output coupling points of the waveguide-based optical coupling element 10 so that the light from a respective eigenmode of the optical component part 400 embodied as a waveguide is converted into an eigenmode of in each case one of the integrated-optical waveguides.

The arrangement sketched in exemplary fashion in FIG. 1 can be modified in many ways. Thus, in FIG. 1, the substantially rectangular cross section of the partial waveguides 330, 340 is maintained along the propagation direction and is only modified in relation to the lateral position and orientation. In alternative embodiments, it is possible also to change the form and/or the size of the cross section along the propagation direction and, in particular, continuously convert a rectangular form into any other form, in particular a square, elliptical or round form. Further embodiments are conceivable. In particular, the form can be adapted to the cross sections and the mode field profiles of the optical coupling points 370, 380 of the optical component parts 430, 440 to be linked, in order thus to obtain efficient coupling. Hence, in addition to the separation of modes, the arrangement according to the invention renders it possible to obtain a low-loss connection between at least two optical component parts whose optical coupling points are characterized by mode fields of very different size or position.

Figure 2:
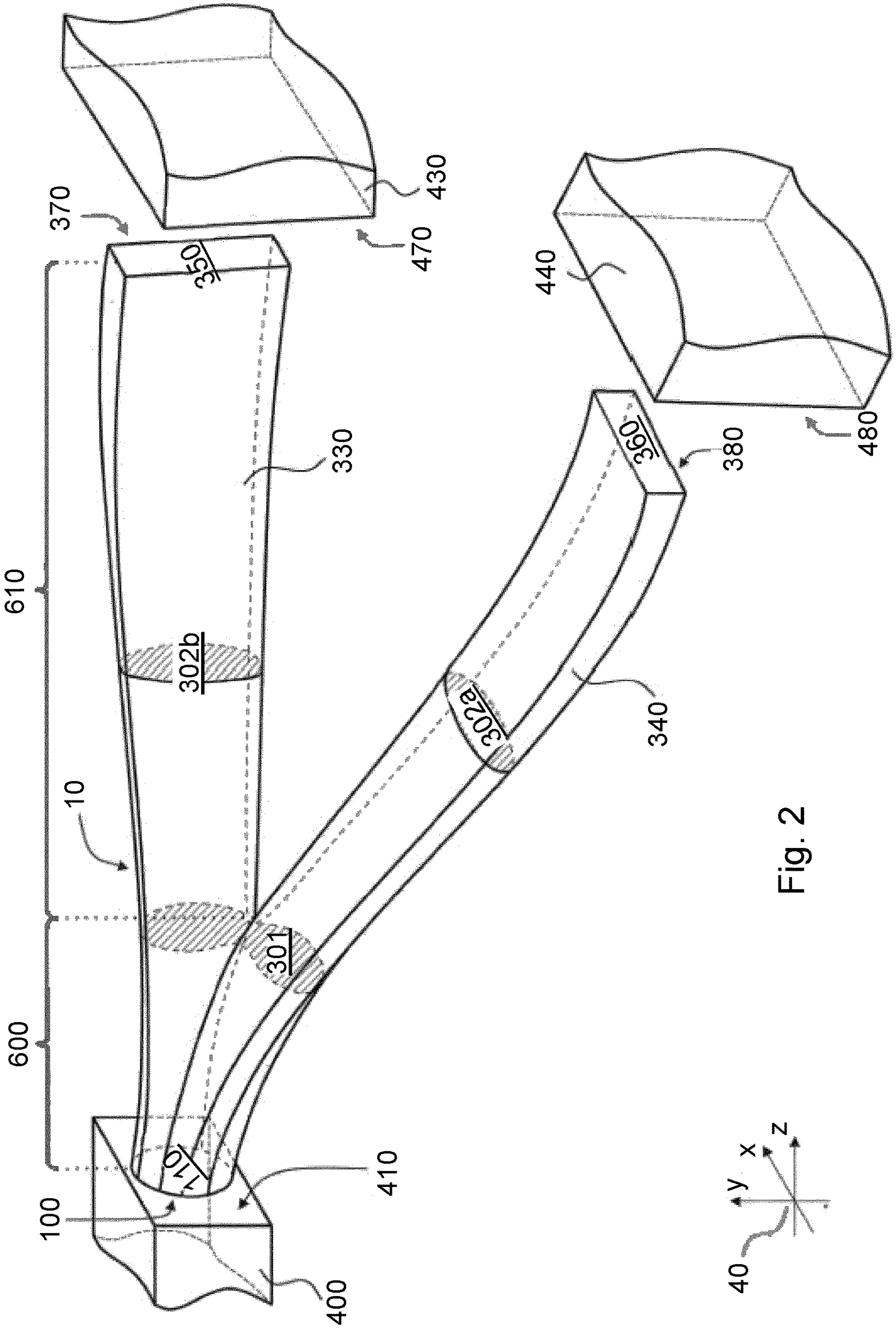

Moreover, as illustrated in exemplary fashion in FIG. 2, further embodiments of the arrangement sketched out in FIG. 1 are possible, in which the waveguide sections 200, 300 depicted as clearly distinguishable in FIG. 1 merge seamlessly into one another without a clear geometric delimitation or are wholly or partly unified. The functionality of the waveguide-based optical coupling element 10 for polarizing beam splitting or for polarizing beam combining is based in particular on the fact that the waveguide-based optical coupling element 10 comprises at least two partial waveguides 330, 340 which are very close together or spatially overlapping in a first region 600, as indicated by the reference sign 301 in FIG. 2, and which, when considered in isolation from one another, at least sectionally have eigenmodes with very different effective indices, while the at least two partial waveguides 330, 340 are spatially disjoint in a second region 610, as indicated in FIG. 2 by reference signs 302*a*, 302*b*. In this case, the term of "very close together partial waveguides" in a first region 600 means that the eigenmodes guided in the two partial waveguides 330, 340 at least regionally overlap and hence are able to interact with one another.

In the arrangements sketched out in FIGS. 1 and 2, the two mode fields 120*a*, 130*a* are only made to spatially diverge by the partial waveguides 330, 340 without there being a change in the polarization direction. By contrast, in other cases it is desirable to change the polarization direction of the mode fields made to diverge, for example in order to convert these into two TE modes of integrated-optical waveguides. Corresponding arrangements are the subject matter of some of the following exemplary embodiments; see FIG. 3, 8, 9 or 10, for example.

Furthermore, the arrangement according to the invention can also be used to separate any desired modes, in particular two modes with the same polarization but different field distributions. In this embodiment, the form of the waveguide-based optical coupling element 10 is modified accordingly, as already described above. In this case, it is for example possible—in a manner similar to the above-described separation of modes with different polarization directions—to exploit the fact that the modes to be separated are guided with different strengths in suitably formed waveguides, and that a separation can consequently be achieved by making the waveguides geometrically divergent. Moreover, implementations are conceivable, in which differently strong coupling of the modes to be separated to waveguides running in parallel (in a manner similar to the so-called directional couplers) are exploited. A further option consists in the targeted conversion of modes by a periodic modulation of the waveguide cross section in the axial direction, with the fundamental wavenumber of this modulation corresponding to the difference in the wavenumbers of the modes to be coupled. Hence, any desired modes can be converted into field forms which can be separated from one another with particularly low losses and particularly reliably—for example with the aid of the concepts described above. By way of example, a potential field of use in this case is the separation of modes at the facet of a multi-mode fiber or a so-called few-mode fiber and the input coupling of the corresponding optical signals into different optical coupling points of an optical component part. The configurations of the coupling element corresponding to such an object can be determined, inter alia, by what are known as topology optimization methods, in which not individual geometry parameters but the entire form of the coupling structure are numerically optimized. The structured geometries obtained thereby elude a generally valid description but likewise facilitate the realization of the arrangement according to the invention for optical coupling and mode separation.

In a specific embodiment, the waveguide-based optical coupling element 10 is connected to a plurality of optical components 400, 430, 440. To adapt the form of the waveguide-based optical coupling element 10 to the positioning inaccuracies of these components, it is advantageous to very precisely acquire positions and directions of the associated further optical coupling points 410, 470, 480 in the coordinate system 40 of the free-form microstructuring unit used to produce the optical coupling element. To this end, adjustment marks 411, 412, 471, 472, 481, 482, which are schematically illustrated in FIG. 1, or alternative structure elements (not illustrated) on the optical coupling points 400, 430, 440 to be linked, the relative position of which adjustment marks or structure elements is known very accurately in relation to the further optical coupling points 410, 470, 480, can preferably be used. The adjustment marks 411, 412, 471, 472, 481, 482 or the alternative structure elements can preferably be detected by way of an imaging method, in particular by way of a camera-based method, which preferably permits the localization in three-dimensional space of the adjustment marks 411, 412, 471, 472, 481, 482 or of the alternative structure elements. In the process, it is preferably also possible to use confocal imaging methods. In this case, it is possible in particular to use parts of an optical beam path of the free-form microstructuring unit both for the detection of the adjustment marks 411, 412, 471, 472, 481, 482 and for the exposure of the waveguide-based optical coupling element 10 to be produced. The detection of the adjustment marks 411, 412, 471, 472, 481, 482 or of the alternative structure elements can be implemented with the highest possible accuracy, with deviations preferably being less than 500 nm, particularly preferably less than 200 nm, in particular less than 100 nm or 50 nm. The positioning accuracy of the waveguide-based optical coupling element 10 to be produced by the free-form microstructuring method and of the further optical coupling points 410, 470, 480 on the optical coupling points 400, 430, 440 to be linked is preferably better than 500 nm, particularly preferably better than 200 nm, in particular better than 100 nm or 50 nm. These values relate to the production of arrangements and structures according to the invention, which are provided for a vacuum operating wavelength of approximately 1.5 μm.

Figure 3:
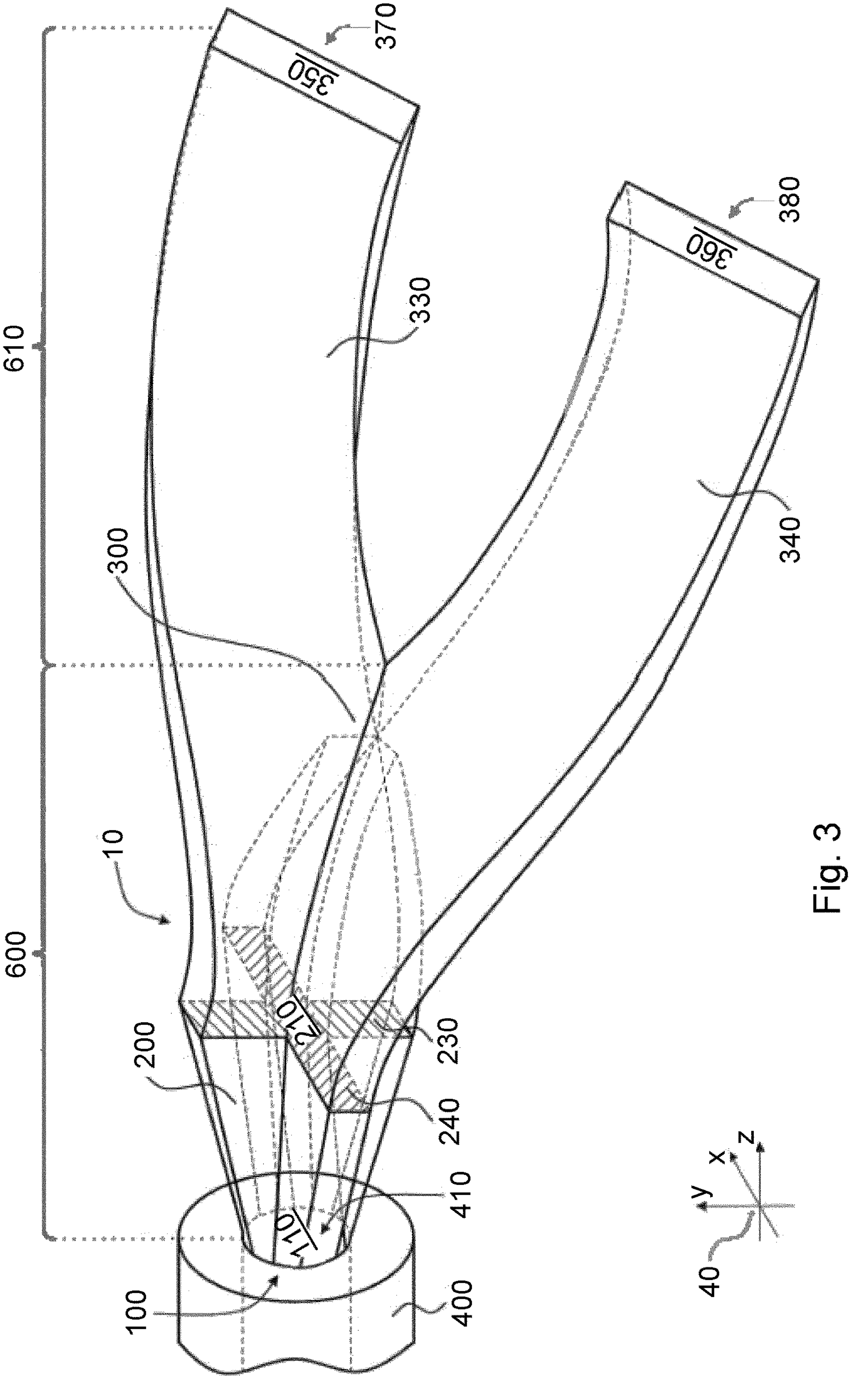

In the embodiment sketched out in FIG. 3, the optical component part 400 is configured as a single mode optical fiber with a rotationally symmetric index profile, which has two degenerate or virtually degenerate approximately linearly polarized waveguide modes (e.g., what are known as LP01 modes). In this case, the term “degenerate or virtually degenerate modes” describes waveguide modes with very similar effective refractive indices, the difference of which is typically less than 0.001. In the case of standard single mode fibers, the two differently polarized fundamental modes have very similar intensity distributions; that is to say, the normalized overlap integral of the spatial intensity distributions is close to 1 and is preferably greater than 0.9 or 0.95. The waveguide-based optical coupling element 10 allows separation of the two first eigenmodes 120, 130 assigned to the first optical coupling point 100 or separation of mutually orthogonal linear combinations of the two eigenmodes 120, 130, that is to say a first eigenmode 120 of the optical component part 400 or the first linear combination of the eigenmodes 120, 130 is converted into an eigenmode 260, for example a so-called TE mode, of the first integrated-optical component part 430, which is denoted by the reference sign 71*a* in FIG. 8, while a second eigenmode 130 of the component part 400 or the second linear combination of the eigenmodes 120, 130 is converted into an eigenmode 280, for example once again a so-called TE mode, of the second integrated-optical component 440, which is denoted by the reference sign 71*b* in FIG. 8. The second modes of the output waveguides 430, 440, for example denoted as “TM”, are not excited in this embodiment apart from unwanted cross talk.

As shown in FIG. 3, this can preferably be implemented by a continuous twist of the partial waveguides 330, 340. Further examples can be found in FIGS. 8, 9 and 10. This structure can also be modified in many ways. Thus, it is preferably possible to let the twisting of the waveguides already start in the first region 600 of the waveguide-based optical coupling element 10, in which the waveguides have not yet been brought apart. Moreover, further structure geometries of the waveguide-based optical coupling element 10, which can preferably be determined by numerical parameter or topology optimization methods, are conceivable.

Figure 4:
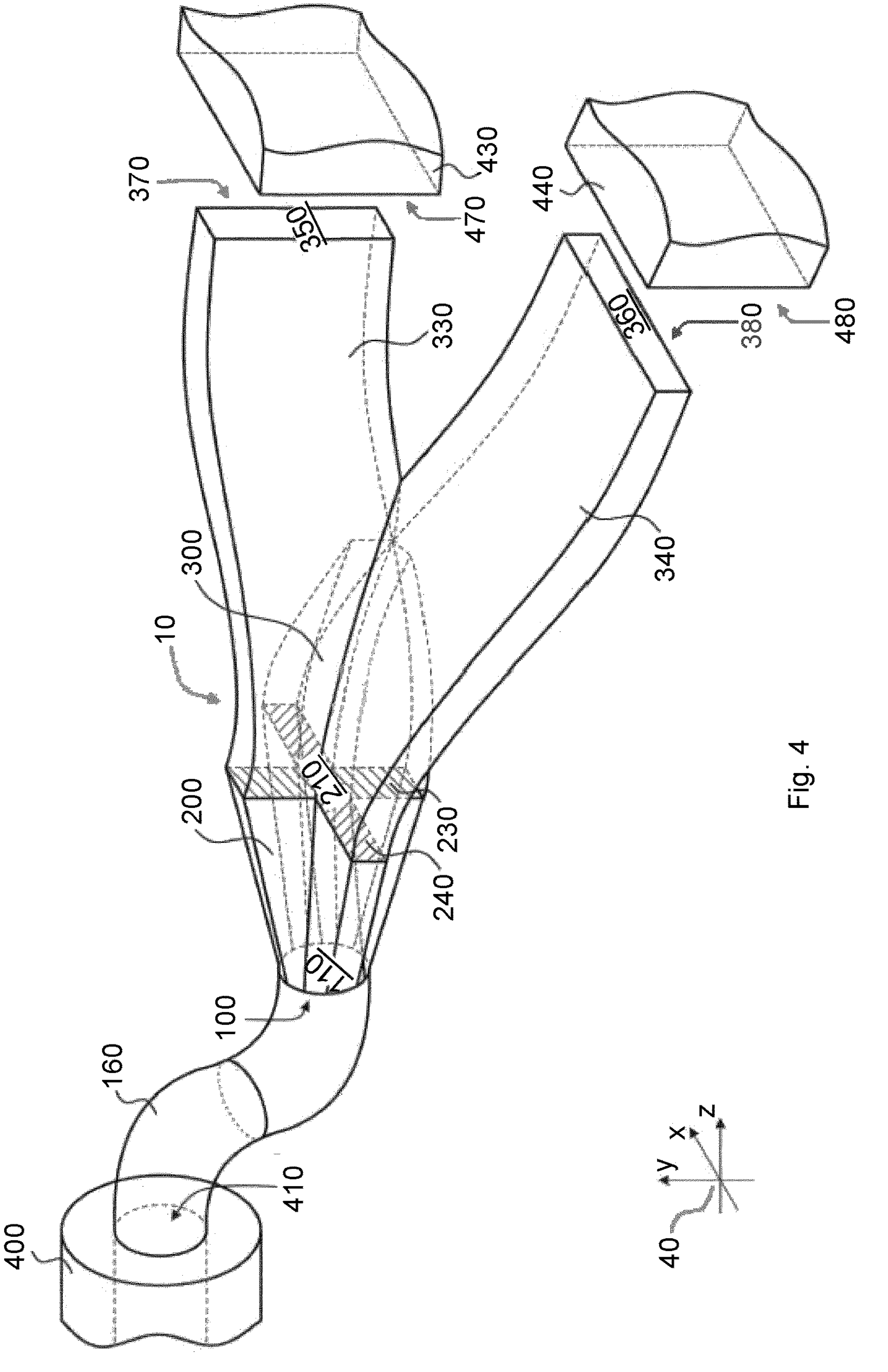

As depicted in exemplary fashion in FIG. 4, the waveguide-based optical coupling element 10 can be produced by a three-dimensional free-form microstructuring method in situ at the optical coupling point 410 of the optical component part 400 or between at least two further optical coupling points 410, 470, 480 of at least one optical component part 400, 430, 440 and said waveguide-based optical coupling element can be adjusted in terms of position, form and size to the position and orientation of the at least two further optical coupling points 410, 470, 480 of the at least one optical component part 400, 430, 440 in this case. In view of fast and high-throughput manufacturing, forms that are as simple as possible and have the smallest possible volumes are preferred for the waveguide-based optical coupling element 10. By way of example, simple contiguous regions with few structure details or topologies, which have as few so-called "holes" as possible in three-dimensional space, are advantageous in terms of the form. Optical gratings which are likewise suitable for the separation of optical fields often have the problem that they lead to very detailed structures with high demands in respect of accuracy, which require complicated patterning steps. Small volumes can be produced by exploiting the at least sectionally present waveguiding properties of the optical coupling element. In this case, a volume of the waveguide-based optical coupling element 10 produced by a free-form microstructuring method comprises preferably less than 1000 $\mu m^3$, particularly preferably less than 500 $\mu m^3$, in particular less than 250 $\mu m^3$ or 150 $\mu m^3$, optionally plus optional connecting waveguides or other mechanical or optical additional structures. These values relate to waveguide-based optical coupling elements 10 which are provided for a vacuum operating wavelength of approximately 1.5 μm and which comprise a material with a refractive index of approximately 1.5. For other operating wavelengths, the volumes of the optical waveguide-based coupling elements 10 can be scaled proportionally to the third power of the operating wavelength while taking account of the respective refractive indices of the utilized materials.

Figure 5:
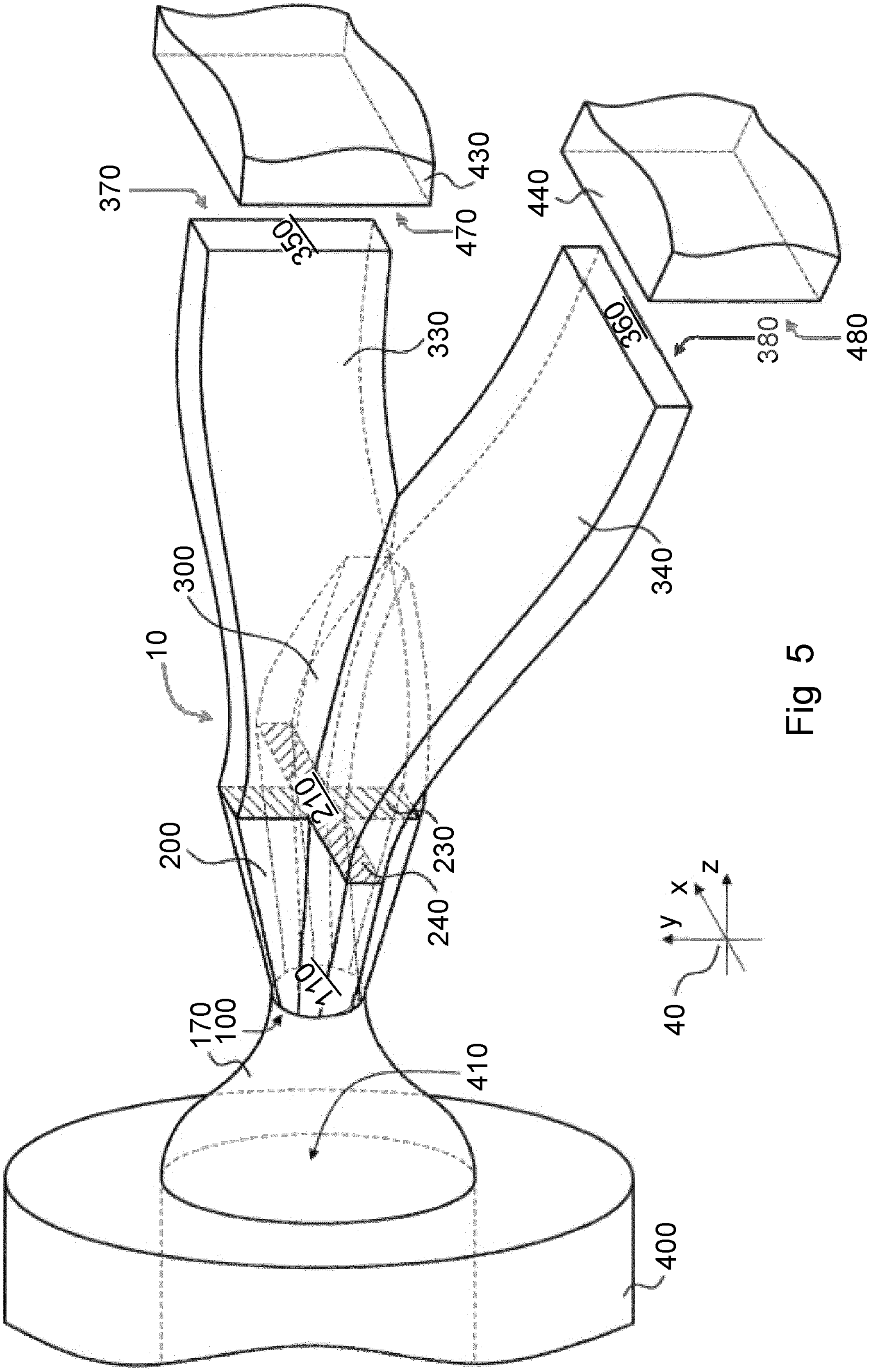

The term of production "at an optical coupling point", used above, describes an embodiment in which optical coupling is facilitated between the waveguide-based optical coupling element 10 and the further optical coupling point 410 assigned to the optical component part 400. To this end and as schematically illustrated in FIG. 1, there can preferably be direct physical contact between the optical component part 400 and the waveguide-based optical coupling element 10 in the region of the first optical coupling point 100. Alternatively, as shown in FIGS. 4 and 5, there can be a transfer of light between the waveguide-based optical coupling element 10 and the further optical coupling point 410 assigned to the optical component part 400 by way of a further structure, which is particularly preferably configured as a connecting waveguide 160, 170. The connecting waveguides 160, 170 can preferably be produced by a free-form microstructuring method in situ, i.e., directly at the target position which may relate in particular to the first optical coupling point 100, preferably together with the waveguide-based optical coupling element 10, in order thus to advantageously facilitate a very precise alignment of the optical elements with respect to one another and with respect to the waveguide-based optical coupling element 10.

FIG. 4 shows, in exemplary fashion, an arrangement in which an S-shaped waveguide segment was inserted, as a connecting waveguide 160, between the further coupling point 410 of the optical component part 400 configured as an optical fiber, in particular as a single mode fiber, and the first optical coupling point 100 of the waveguide-based optical coupling element 10, whereby it is possible to achieve a translation and/or a rotation of the waveguide-based optical coupling element 10 relative to the securely assembled component part 400. This renders it possible to adapt the position of the waveguide-based optical coupling element 10 relative to the position and/or orientation of the second further optical coupling point 470 assigned to the further security assembled optical component part 430, even if the relative positions of the component parts 400, 430 are subject to unavoidable variations emerging from manufacturing tolerances. In addition to the embodiment illustrated in FIG. 4, a waveguide segment (not illustrated), which can be used to further increase the degrees of freedom in relation to the positioning of the waveguide-based optical coupling element 10, can also be inserted between the second further optical coupling point 470 of the optical component part 430 and the associated optical coupling point 370 of the waveguide-based optical coupling element 10.

As an alternative or in addition, the additional connecting waveguides 160, 170 may also serve to adapt mode fields present at the further optical coupling point 410 of the optical component part 400 to the assigned first optical coupling point 100 of the waveguide-based optical coupling element 10. As illustrated in exemplary fashion in FIG. 5, the additional connecting waveguide 170 can be designed as a taper. In this case, the term "taper" denotes a waveguide segment which has tapering in one direction. In this case, the taper can be designed such that there is an adiabatic adaptation of the spatial mode distribution that is as low loss as possible, that is to say that the predominant component of the power of the first mode distribution is converted into the second mode distribution and is neither emitted nor absorbed. Here, it is also possible that the additional connecting waveguide 170 used for the mode field adaptation has a multimode configuration at least sectionally, even though both the optical component part 400 connected thereto and the waveguide-based optical coupling element 10 have single mode optical coupling points. This embodiment may occur in the case of a tapered connecting waveguide 170 that is connected to an optical fiber, said connecting waveguide having a greater refractive index contrast than that of the optical fiber on account of the chosen cladding material but the initial diameter thereof being adapted to the refractive index of the optical fiber. What can be achieved in this embodiment by way of a suitable design is that efficient coupling nevertheless remains possible, in particular by virtue of avoiding the excitation of higher modes in the multimode section. Deviating from the arrangements sketched in FIG. 4 and FIG. 5, the connecting waveguide 160, 170 and/or the waveguides contained in the optical component part 400 and assigned to the optical coupling point 410 may have non-rotationally symmetric cross sections, for example rectangular or elliptical cross sections, with non-degenerate waveguide modes of different polarizations. In this case, the connecting waveguide 160, 170 may have a twist along the propagation direction, whereby it is able to continuously change the polarization direction of the non-degenerate eigenmodes.

Multimode waveguides may also occur when the waveguide-based optical coupling element 10 comprises at least two partial waveguides 330, 340 which contain cross sections characterized by a high aspect ratio, preferably in order to achieve a large difference in the effective refractive indices and hence strong decoupling of the two differently polarized fundamental modes. In the process, the case where higher modes are capable of propagating in addition to the fundamental mode for the polarization belonging to the strongly guided fundamental mode may occur. In this case, the excitation of these higher modes can be completely avoided by way of suitable shaping of the partial waveguides 330, 340. As depicted schematically in FIG. 6, this can in particular be achieved by virtue of the multimode partial waveguides 330, 340 with very elongate cross sections 350, 360 being converted back to single mode cross-sections 355, 365 using suitable tapers 331, 341 following the divergence of the partial waveguides 330, 340 and the spatial separation of the strongly guided fundamental modes accompanying this.

Alternatively, the excitation of higher modes can be deliberately accepted and it is possible to provide suitably formed tapers 331, 341 which facilitate a guidance of the interfering mode fields back to a well-defined, very localized output field that is adapted to the fundamental mode of a subsequent waveguide. For the purposes of configuring the tapers 331, 341 in the exemplary embodiment according to FIG. 7, a respective lateral offset 372, 382 of the centroids 371, 381 of the taper end surface 355, 365 is configured in relation to the centroids 351, 361 of the respective input surface 350, 360, which can preferably be numerically optimized.

Figure 6:
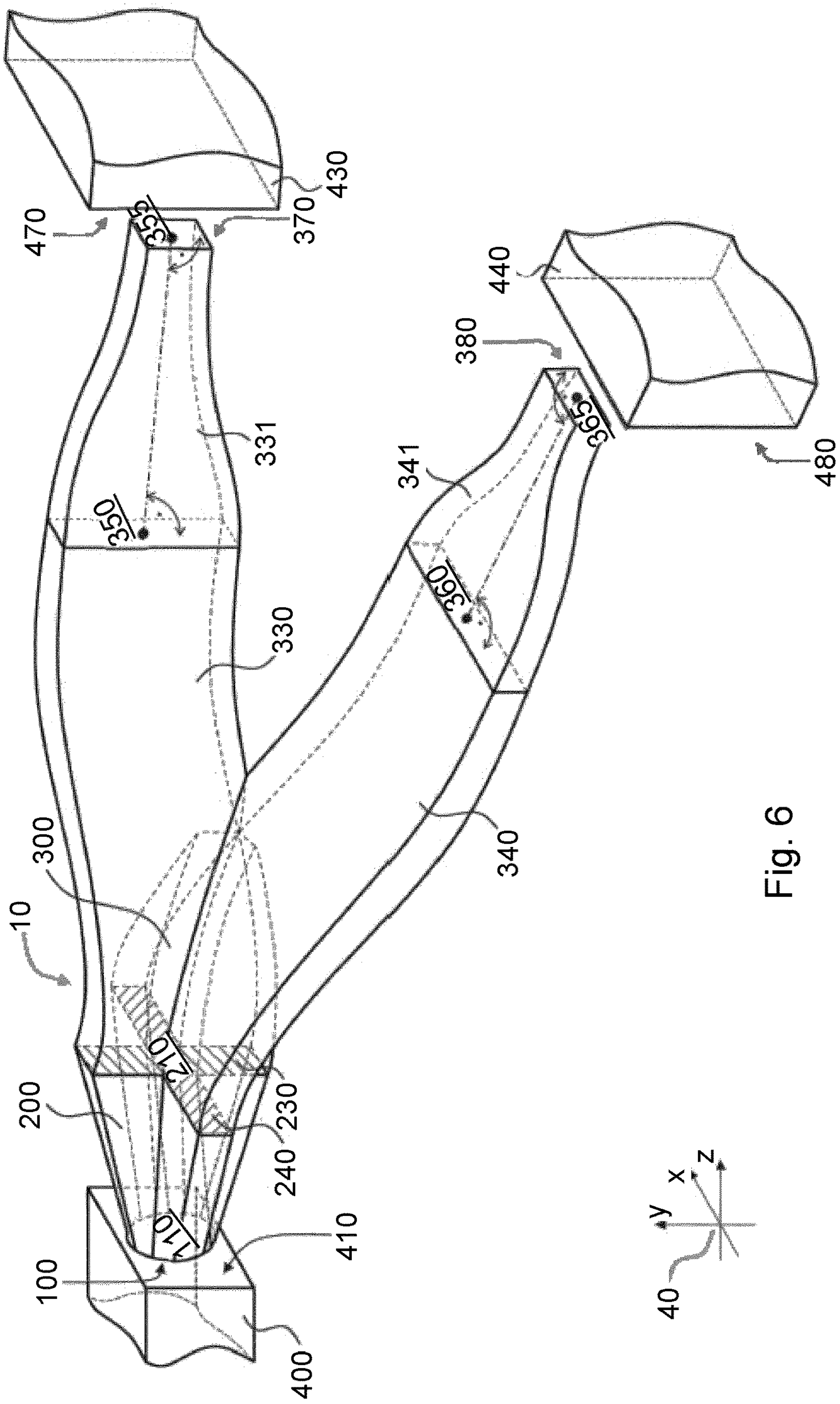
Figure 7:
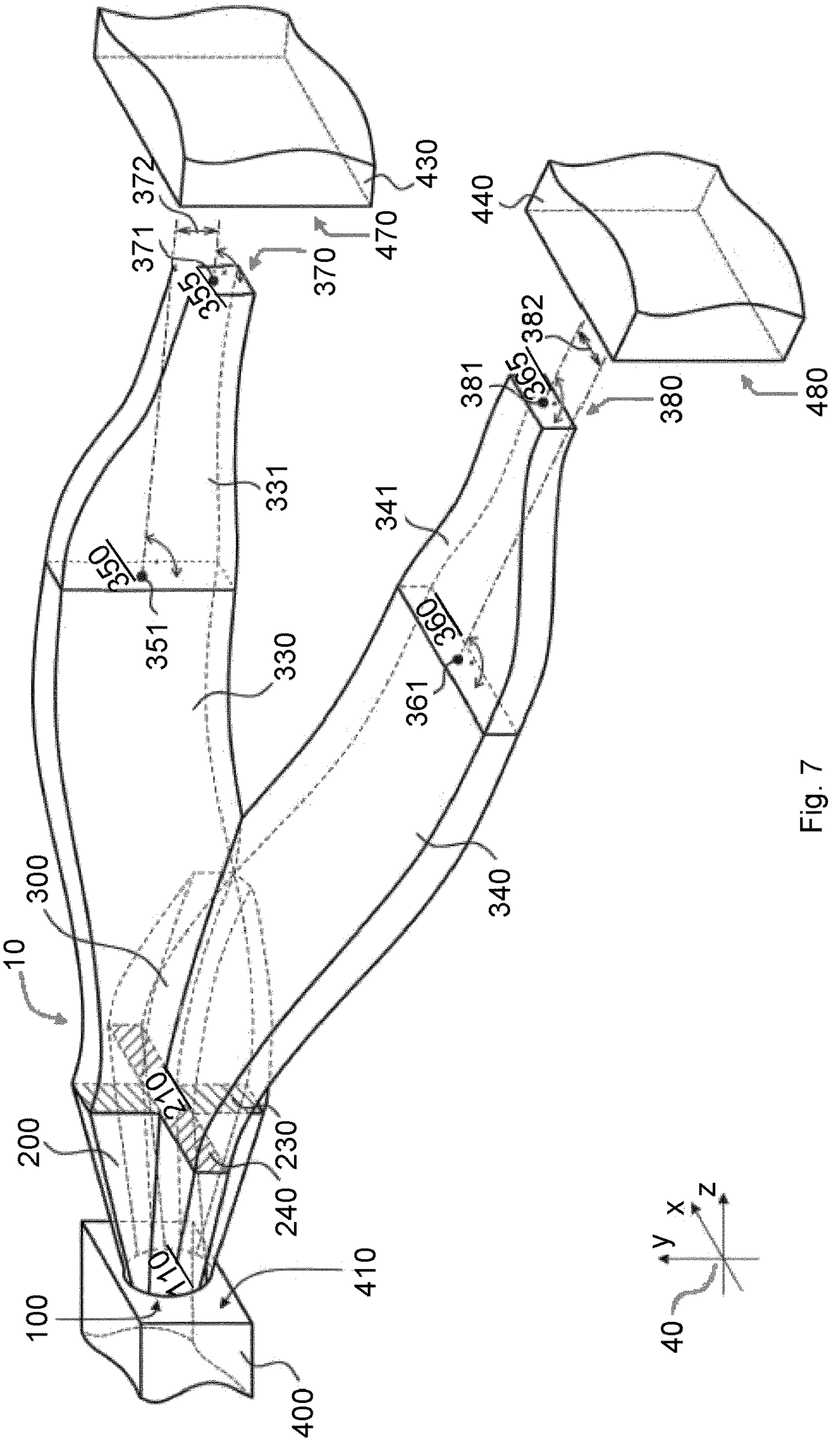

The tapers 331, 341 illustrated in FIGS. 6 and 7 should be understood to be exemplary and can be modified in many ways. For instance, it is preferably possible to obtain a significant extinction of the weakly guided mode, and hence to increase the extinction ratio, by way of suitable curvatures of the waveguide trajectories or by way of fin-shaped auxiliary structures applied to the waveguide core. Furthermore, the partial waveguides 330, 340 can merge into the taper sections 331, 341 without clear geometric delimitation or can be entirely combined with the latter. Further, it is possible to design corresponding structures by way of numerical parameter optimization methods or topology optimization methods and/or to improve said structures proceeding from the geometries according to FIGS. 6 and 7.

Figure 8:
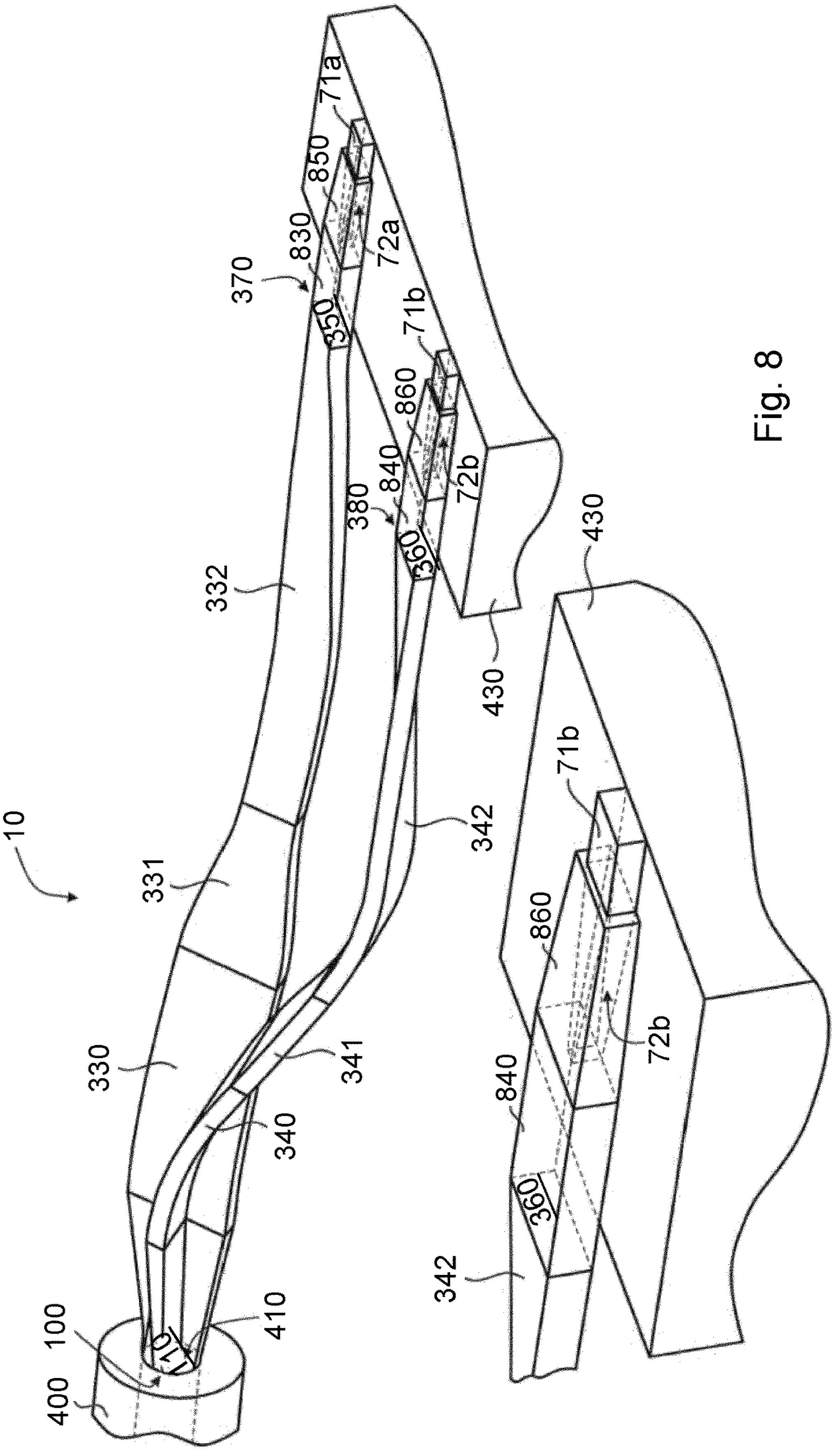
Figure 9:
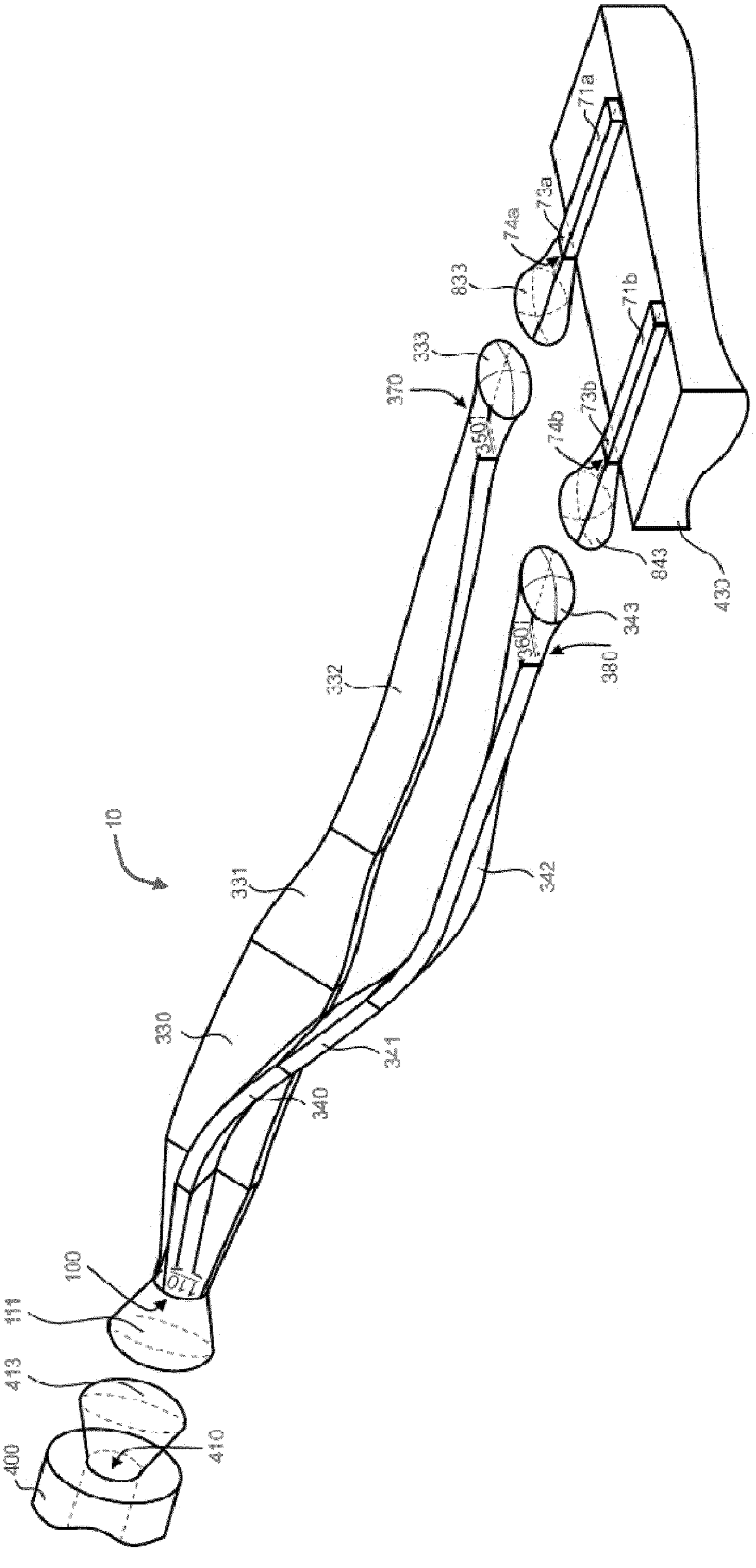
Figure 10:
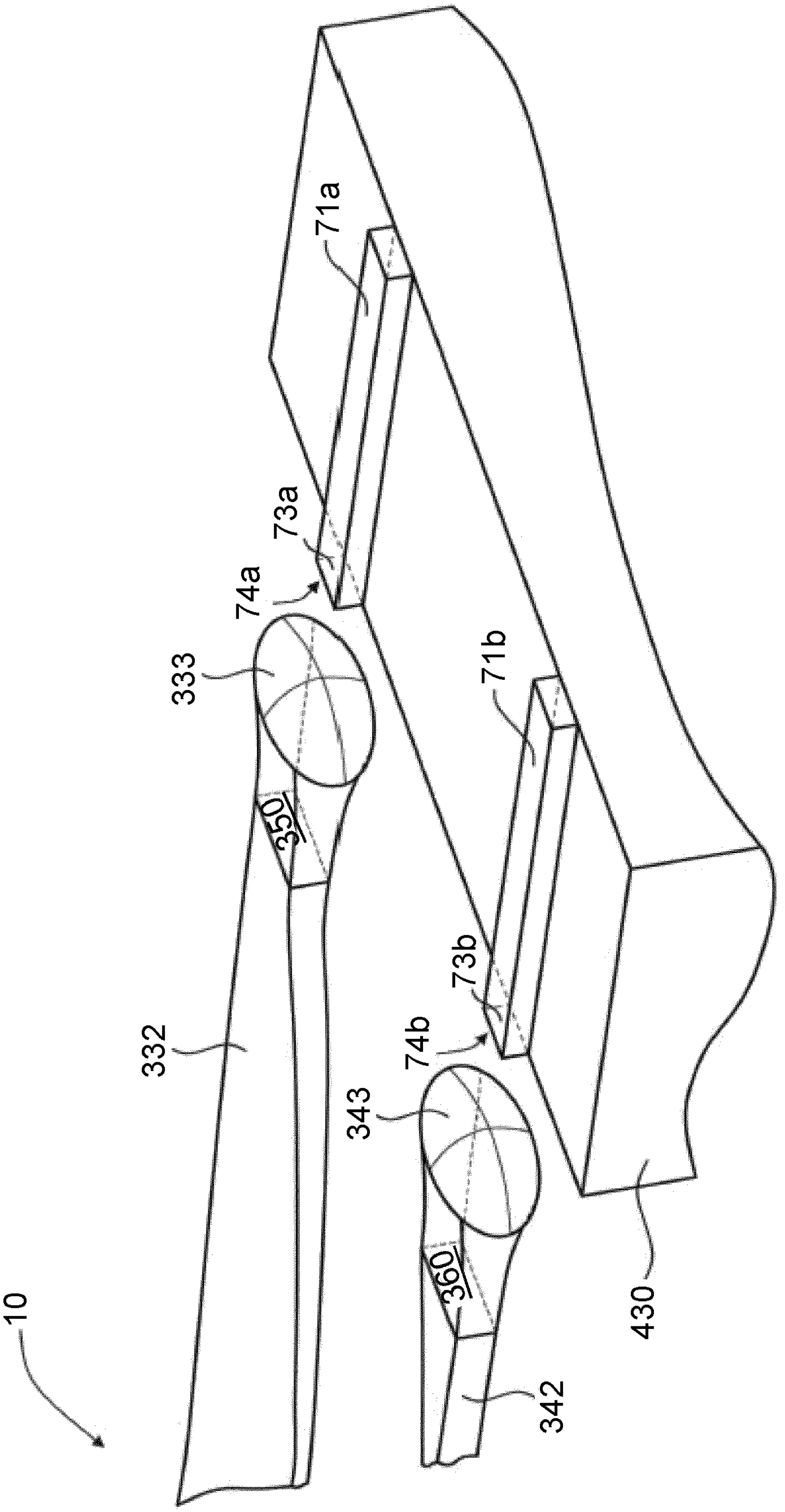

Various options of optically coupling the waveguide-based optical coupling element 10 to optical components are illustrated in exemplary fashion in FIGS. 8, 9 and 10. Thus, for example, arrangements are conceivable, in which the first optical coupling point 100 of the waveguide-based coupling element 10 is not in direct physical contact with the further optical coupling point 410 of the optical component part 400 and in which there is also no connection by way of additional connecting waveguides 160, 170. Instead, the light can propagate through an at least regionally homogeneous medium between the optical coupling points 100, 410. This may lend itself to providing the first optical coupling point 100 of the waveguide-based optical coupling element 10 and/or the further optical coupling point 410 of the optical component part 400 with beam-shaping elements 111, 413 in order thus to facilitate efficient optical coupling, as depicted in FIG. 9 for example. The beam-shaping elements 111, 413 can preferably be produced together with the waveguide-based optical coupling element 10 by way of a free-form microstructuring method, which in particular facilitates a very precise alignment in relation to the relevant optical coupling points 100, 410.

FIG. 8 shows an embodiment in which the optical coupling between the two further optical coupling points 370, 380 of the waveguide-based optical coupling element 10 and the integrated-optical waveguides 71*a*, 71*b* on an optical chip 430 is implemented by additional connecting waveguides 830, 840 in combination with taper structures 850, 860 on the side of the connecting waveguides 830, 840 and with taper structures 72*a* and 72*b* on the side of the integrated-optical waveguides 71*a*, 71*b*. The connecting waveguides 830, 840 and the associated taper structures 850, 860 can be produced in situ, that is to say at the target position, in the same step as the waveguide-based optical coupling element 10 by way of a free-form microstructuring method and can be aligned in the process with the waveguide structures present on the optical chip 430 with high precision.

FIGS. 9 and 10 show embodiments in which the two further optical coupling points 370, 380 of the waveguide-based optical coupling element 10 are not in direct physical contact with the associated optical coupling points 74*a*, 74*b* of the integrated-optical chip 430. Instead, the light in this case propagates through an at least regionally homogeneous region, which may either be free from materials (vacuum) or be filled with certain gases, liquids or solids, in particular optically transparent capping materials for protecting and stabilizing the entire arrangement, between the optical coupling points. To improve the coupling efficiency, further beam-shaping elements 333, 343 are attached to the end surfaces 350, 360, said beam shaping elements preferably being able to be produced together with the waveguide-based optical coupling element 10 by way of a free-form microstructuring method and therefore being able to be aligned very precisely with the respective optical coupling points.

FIG. 9 shows an embodiment in which beam-shaping elements 833, 843 are also attached to the facets 73*a*, 73*b* of the integrated-optical waveguides 71*a* and 71*b* on the side of the optical chip 430, said beam-shaping elements, together with the beam-shaping elements 333, 343 on the side of the waveguide-based optical coupling element 10, increasing an alignment tolerance when assembling the arrangement. Additionally, the further beam-shaping elements 413, 111 can be applied to the two optical coupling points 100, 410 for the purposes of improving the coupling efficiency between the further optical coupling point 410 of the optical component part 400 and the first optical coupling point 100 of the waveguide-based coupling element 10. As an alternative thereto, it is possible to attach beam-shaping elements to only a single side of the respective optical coupling point, as shown in FIG. 10.

Figure 11:
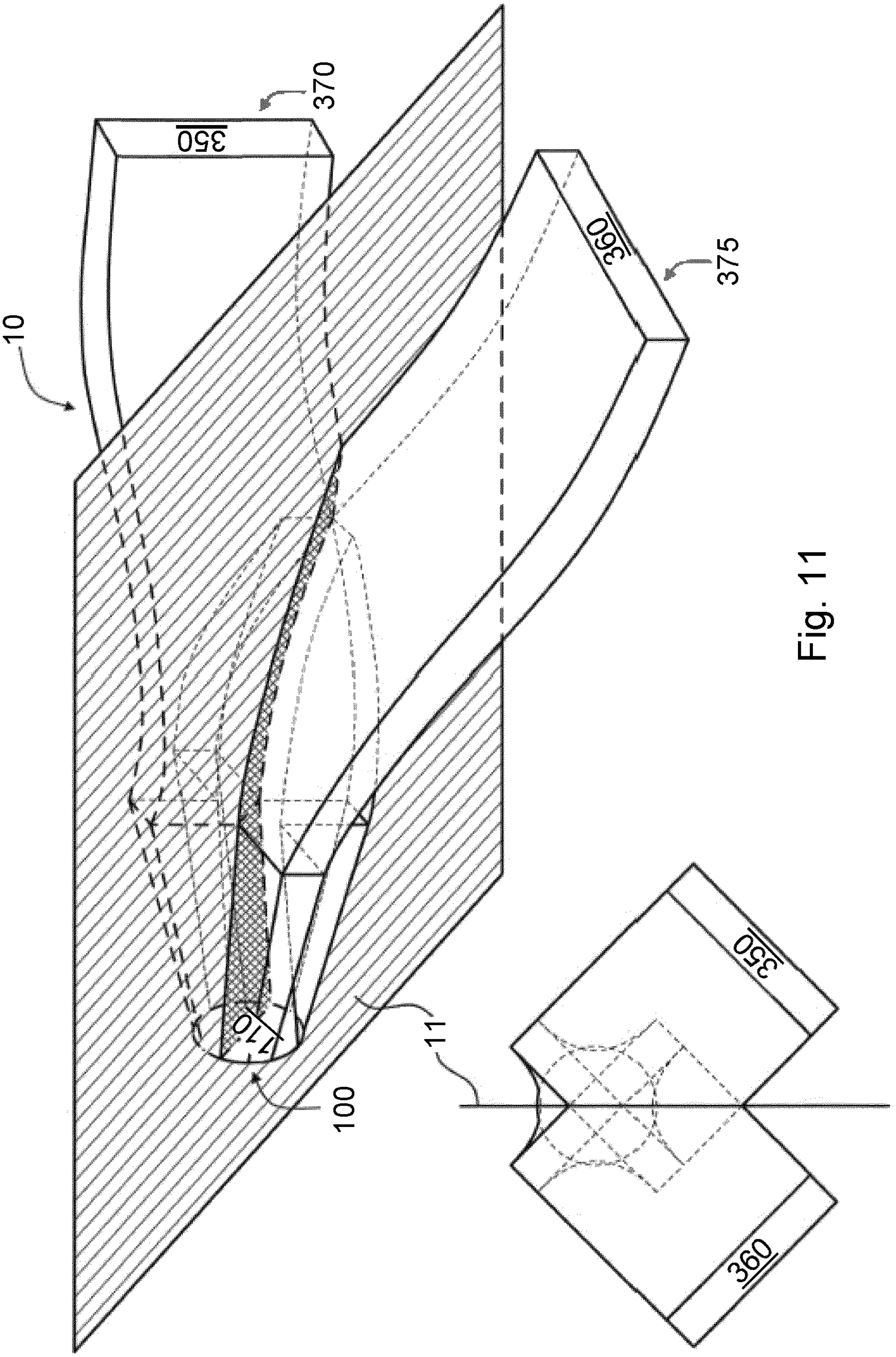

As mentioned above, the free-form microstructuring method in particular renders it possible to produce structures with symmetric or virtually symmetric geometries, which may have very similar losses for the two separated modes. As schematically illustrated in FIG. 11, the virtually symmetric structure geometry in this context denotes a three-dimensional form comprising a plane of symmetry 11, wherein a perfect symmetry may be slightly disturbed by possible adaptations of the structure geometry, which may be necessary in particular for coupling the waveguide-based optical coupling element 10 to positions and directions of the optical coupling points of the optical coupling elements to be linked.

The embodiments described above should be understood to be examples and in no way reflect the full field of use of the arrangement according to the invention. Thus, the waveguide-based optical coupling elements 10 in particular may also be combined with additional functional optical elements or arrangements of such elements, which can be produced together with the respective waveguide-based optical coupling element 10 in situ, that is to say at the respective target position, by using a microstructuring method, preferably a free-form microstructuring method, and which can therefore be connected to and/or aligned with the respective waveguide-based optical coupling element 10 in a very precise fashion. The functional optical elements can preferably further comprise connecting waveguides, tapers, optical power dividers or optical free-form elements, in particular mirrors, lenses or other refractive or diffractive component parts, and can in the process be complemented by further auxiliary structures, in particular by further mechanical support structures. As a result, it is possible to generate more complex functional optical arrangements, for example for polarization analysis, on the facet of optical fibers or integrated-optical waveguides, or else on extended arrays of photodetectors such as camera chips, for example. Such exemplary embodiments are found in FIGS. 12 to 23.

Figure 12:
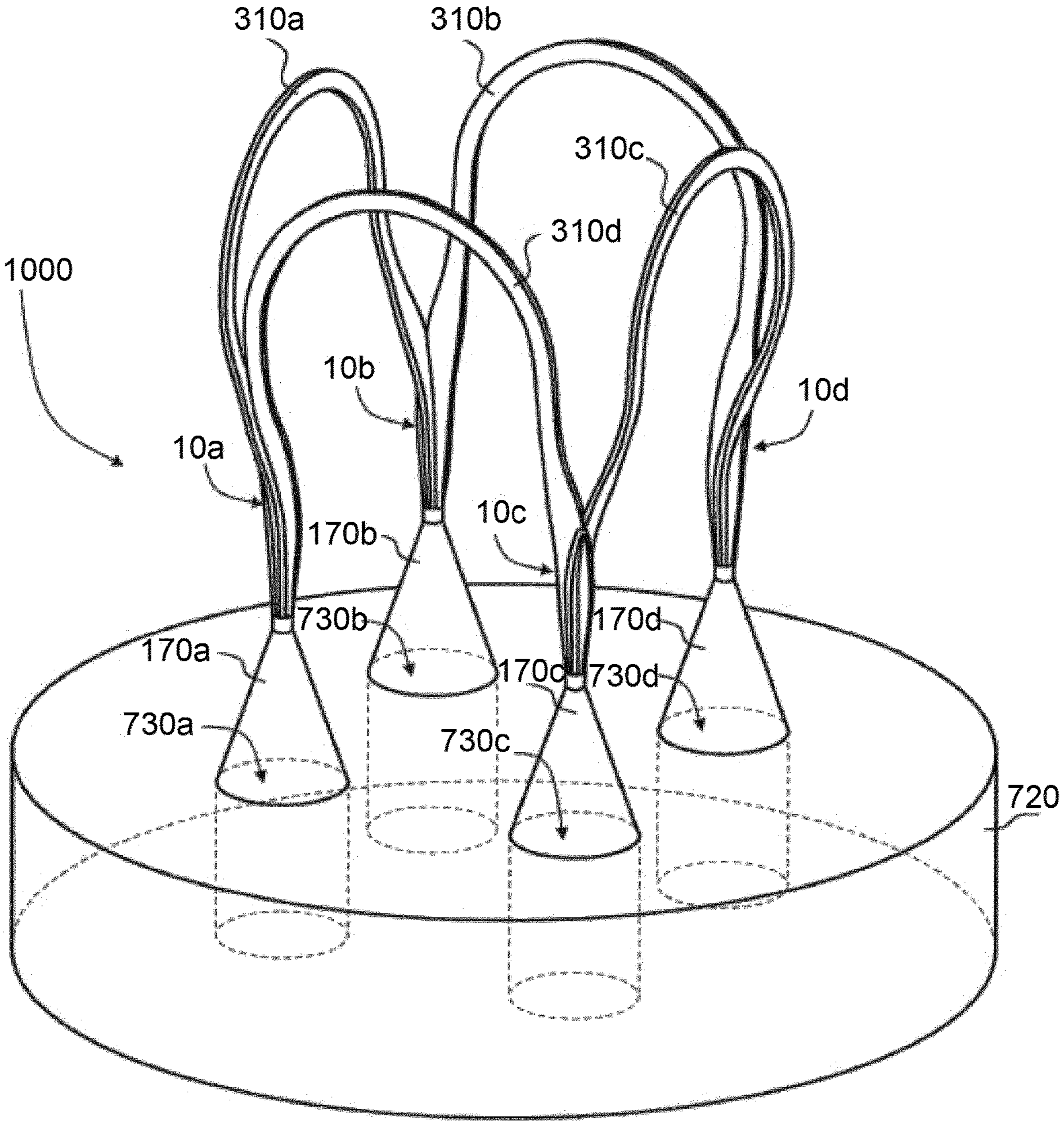
FIGS. 12 to 14 each show a schematic representation of an arrangement which corresponds to a waveguide-based analog of a polarizing beam splitter with four optical coupling points and which can be produced by a free-form microstructuring method on an end surface of a multi-core fiber.

FIG. 12 shows an arrangement 1000 which corresponds to a waveguide-based analog of a polarizing beam splitter cube with four optical coupling points and which can be produced by a free-form microstructuring method on an end surface of a multi-core fiber 720. In contrast to a single optical coupling element, the arrangement shown in FIG. 12 in principle renders it possible to separate and/or merge various polarizations bidirectionally and without power losses. In this case, the multi-core fiber 720 adopts the role of the at least one optical component part 400, which comprises four optical coupling points in the sketched case. The illustrated arrangement comprises four waveguide-based optical coupling elements 10*a*, 10*b*, 10*c*, 10*d* arranged on the end surface of the four-core fiber 720, said optical coupling elements being interconnected by way of additional connecting waveguides 310*a*, 310*b*, 310*c*, 310*d*. In this case, the fiber cores can each have a circular cross section. Alternatively, they can also be configured as polarization-maintaining fiber cores with twofold rotationally symmetric cross sections—this is sketched out in FIG. 13 on the basis of four polarization-maintaining individual fibers. The waveguide-based optical coupling element 10*a* distributes two LP01 modes of the fiber core 730*a* characterized by different polarization directions among the waveguides 310*a*, 310*d* and, from there, couples said modes into a respective LP01 mode of the fiber cores 730*b*, 730*c*. Similarly, the waveguide-based optical coupling element 10*d* distributes the two LP01 modes of the fiber core 730*d* characterized by different polarization directions among the waveguides 310*b*, 310*c* and, from there, couples said modes into the respectively still free LP01 modes of the fiber cores 730*b*, 730*c*. In this embodiment, the waveguide-based optical coupling elements 10*a*, 10*d* serve together as a polarizing beam splitter while the waveguide-based optical coupling elements 10*b*, 10*c* are used together as a polarizing beam combiner. These roles can be interchanged by reversing the light path, and the entire arrangement can be used as a fiber-coupled polarizing beam splitter. In this case, additional taper structures 170*a*, 170*b*, 170*c* and 170*d* are used for efficient coupling to the respective fiber core.

Figure 13:
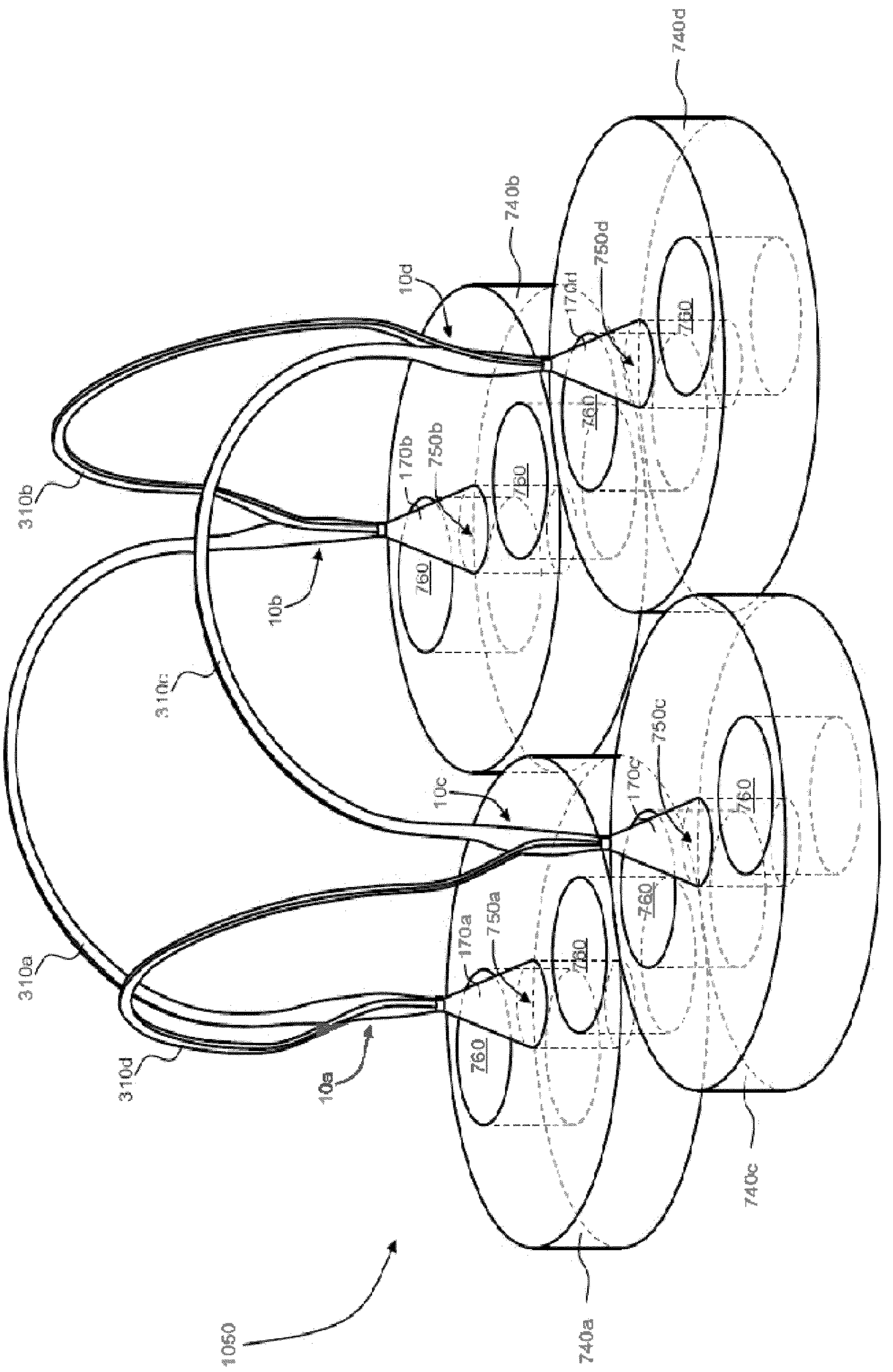

FIG. 13 shows an arrangement 1050 analogous to FIG. 12 on the basis of four polarization-maintaining individual fibers 740*a*, 740*b*, 740*c*, 740*d* with associated fiber cores 750*a*, 750*b*, 750*c*, 750*d*. At this point, the individual fibers 740*a*, 740*b*, 740*c*, 740*d* adopt the role of the at least one optical component part 400. In the depicted arrangement 1050 and as is conventional for many polarization-maintaining fibers, the associated fiber cross sections have a twofold rotational symmetry as a result of additional stress-generating elements 760. A 90° rotation of the polarization-maintaining individual fibers 740*a* and 740*d* about their longitudinal axis allows the functionality of the arrangement to be augmented by the aspect of polarization rotation, in a manner corresponding to the use of additional half wave plates in conventional free beam optics.

Figure 14:
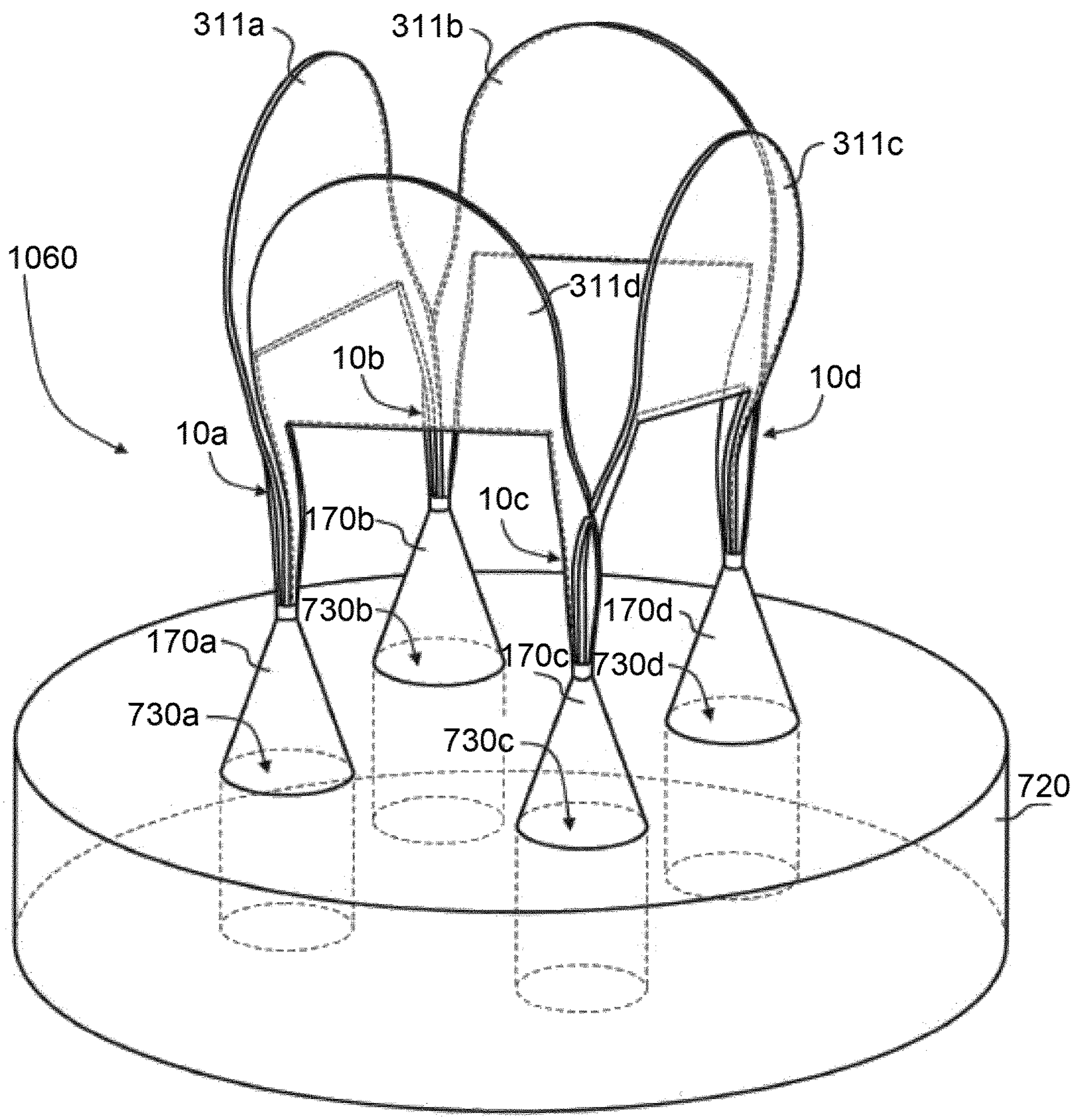

The connecting waveguides 310*a*, 310*b*, 310*c*, 310*d* running between the waveguide-based optical coupling elements 10*a*, 10*b*, 10*c*, 10*d* are sketched as free-form waveguides with a rectangular cross section in FIGS. 12 and 13. As the arrangement 1060 depicted in FIG. 14 shows, the light transmission between the waveguide-based optical coupling elements 10*a*, 10*b*, 10*c*, 10*d* can alternatively be achieved by using so-called whispering gallery modes. This embodiment exploits the fact that light can be guided along a suitably dimensioned convex external contour of an optical high-refractive-index region. By way of example, this allows the optical connections between the waveguide-based optical coupling elements 10*a*, 10*b*, 10*c*, 10*d* to be supported by extensive structure elements 311*a*, 311*b*, 311*c*, 311*d* with a higher mechanical stability. The structure elements 311*a*, 311*b*, 311*c*, 311*d* can additionally be fastened to further mechanical support structures in the region not touched by the guided light without this having a negative influence on the optical transfer properties.

Figure 15:
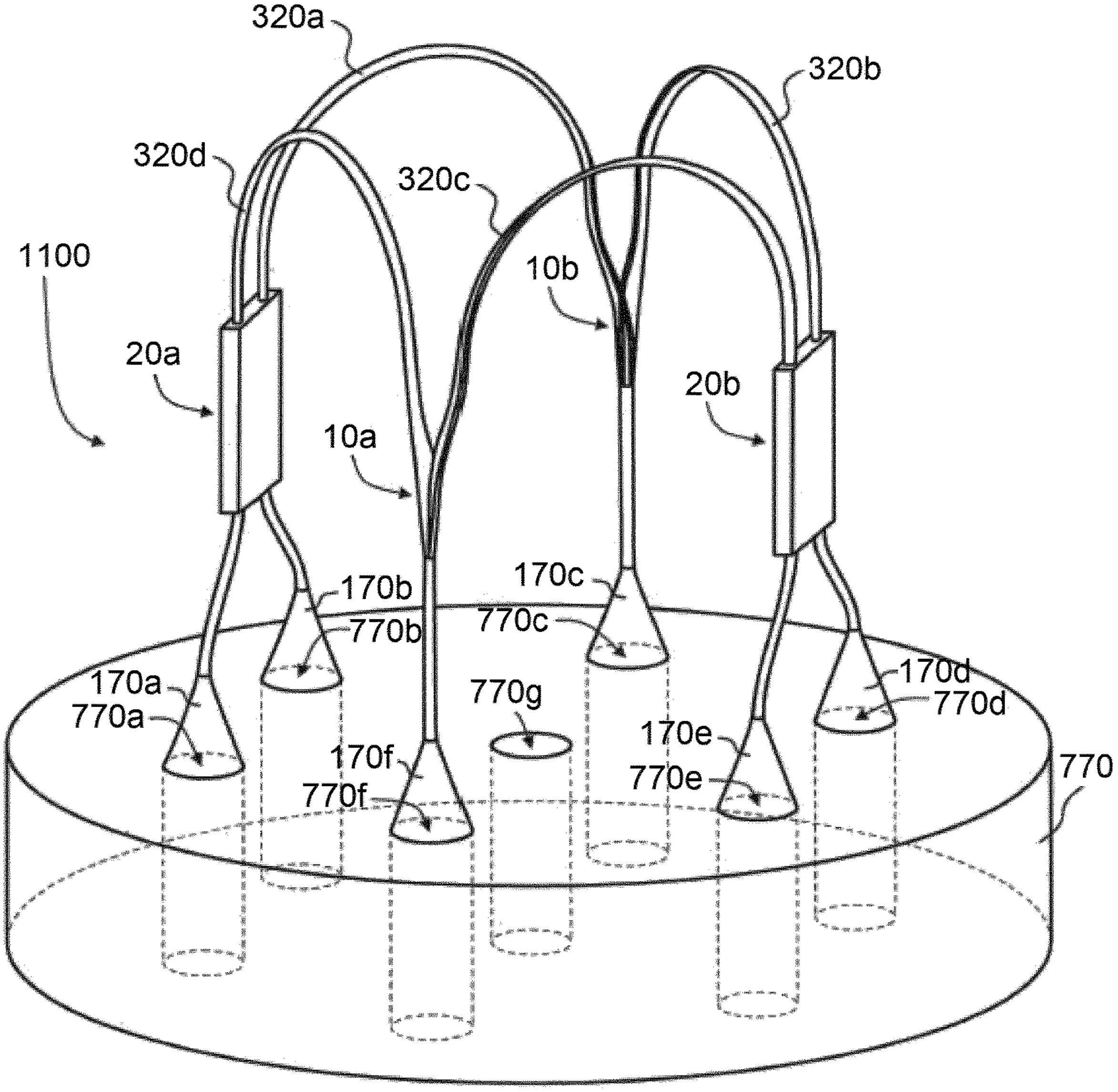
FIG. 15 shows a schematic representation of a passive optical waveguide structure which belongs to an optical polarization multiplex heterodyne receiver and which can be produced on an end surface of a seven-core fiber by using a free-form microstructuring method.

FIG. 15 shows a passive optical waveguide structure 1100 which belongs to an optical polarization multiplex heterodyne receiver and which can be produced on an end surface of a seven-core fiber 770 by using a free-form microstructuring method, the seven-core fiber adopting the role of the at least one optical component part 400 in this case. The arrangement 1100 comprises two waveguide-based optical coupling elements 10*a*, 10*b* for polarization separation, two multimode interference couplers 20*a*, 20*b* for the coherent superposition of the signals contained in the individual polarizations, and further connecting waveguides 320*a*, 320*b*, 320*c*, 320*d* and tapers 170*a*, 170*b*, 170*c*, 170*d*, 170*e*, 170*f*. For the use as a coherent optical polarization multiplex receiver, the fiber cores 770*a*, 770*b*, 770*c*, 770*d*, 770*e*, 770*f* can be connected to external component parts as follows:

- fiber cores 770*a*, 770*b* to a first balanced photodetector;
- fiber cores 770*d*, 770*e* to a second balanced photodetector;
- fiber core 770*g* is not connected;
- fiber core 770*c* to a data signal source and fiber core 770*f* to a local oscillator, or vice versa.

The data signal is decomposed into two signal components, which correspond to the two degenerate orthogonally polarized LP01 eigenmodes of the associated fiber core, by way of the waveguide-based optical coupling element 10*b* connected to the data signal input. Similarly, the local oscillator signal is decomposed into two signal components, which correspond to the two degenerate orthogonally polarized LP01 eigenmodes of the associated fiber core, by way of the waveguide-based optical coupling element 10*a* connected to the local oscillator input. The polarization directions of these data signal components and local oscillator signal components are matched to one another by the twist of the waveguides 320*a*, 320*b*; 320*c*, 320*d* adjoining the optical coupling elements and are superposed by the multimode interference couplers 20*a*, 20*b*. The superposition signals are supplied to the balanced photodetectors. The polarization multiplex data signal is reconstructed by processing, generally digital processing, of the electrical signals, which may be generated by the photodetectors serving as a mixer. Possible imperfections in the shown distributor structure can be compensated within the scope of this processing.

The arrangement 1100 illustrated in FIG. 15 should be understood to be exemplary and can be modified in many ways. Thus, a polarization multiplex homodyne receiver can be provided by the addition of additional fiber cores and by an appropriate augmented signal superposition, preferably by using 2-to-4 multimode interference couplers. Further, the polarizing beam splitter connected to the local oscillator can be replaced by a simple power splitter. The structure can not only be produced on an end surface of a multi-core fiber, but a one-dimensional fiber array or a two-dimensional fiber array or an arrangement of other waveguides, for example integrated-optical waveguides, can also be used alternatively. Similar to the embodiment shown in FIG. 13, polarization-maintaining fibers can also be used in this case.

Figure 16:
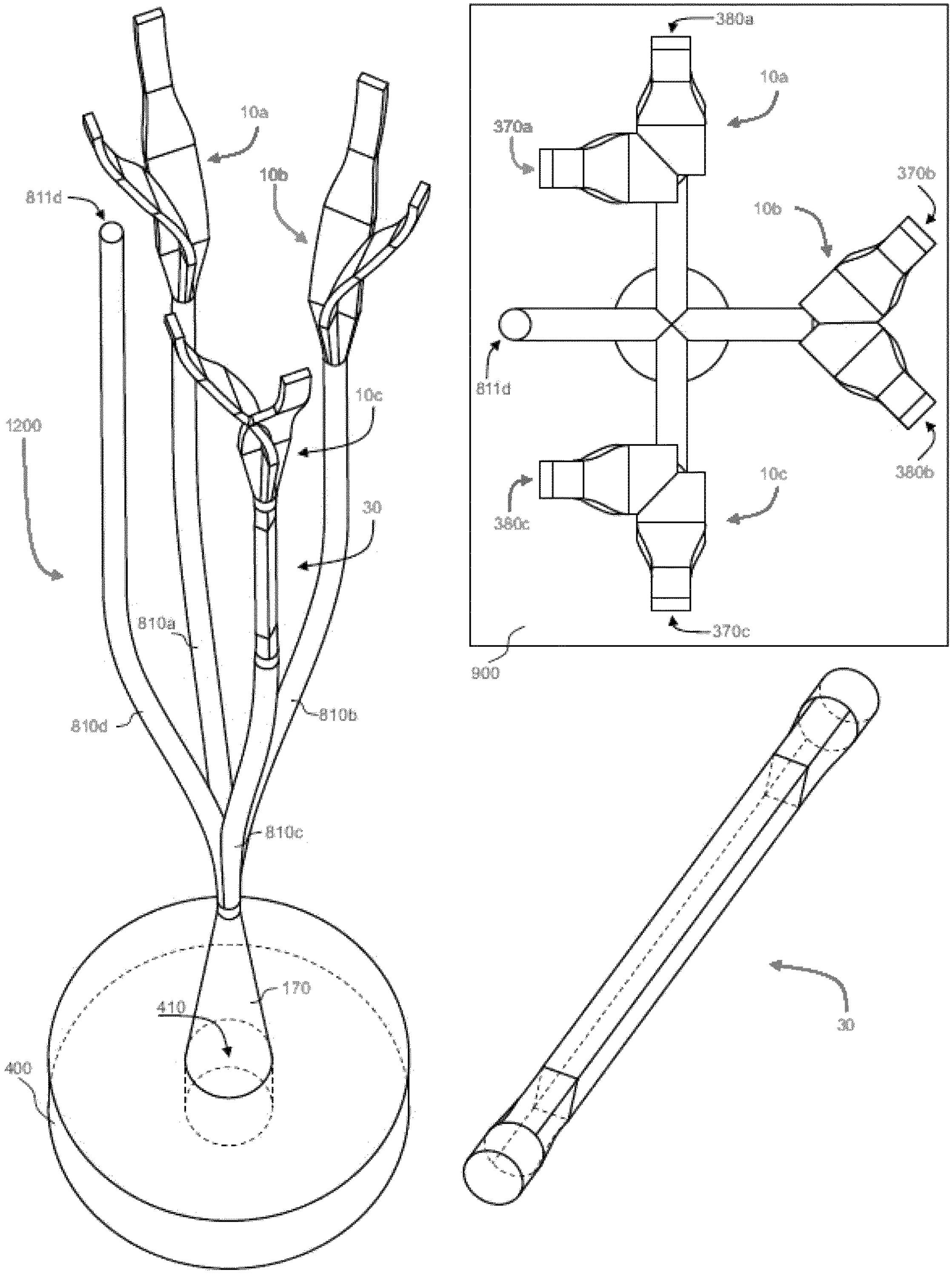
FIG. 16 shows a schematic representation of a polarization analyzer structure, which can be produced on an end surface of a single mode fiber by using a free-form microstructuring method.

FIG. 16 shows a polarization analyzer structure 1200 which can be produced on an end surface of a single mode fiber by using a free-form microstructuring method, the single mode fiber adopting the role of the at least one optical component part 400 in this case. The light coupled from the fiber into the structure via the further optical coupling point 410 is initially distributed uniformly among four waveguides 810*a*, 810*b*, 810*c*, 810*d*. In this case, two waveguide-based optical coupling elements 10*a*, 10*b* which are rotated through 45° with respect to one another with their main axes are connected to the waveguides 810*a*, 810*b*, whereby the signal components can be isolated in the associated polarization directions that are inclined through 45° with respect one another. In this case, the main axes of the optical coupling element are defined by the polarization directions of the linear polarizations separated by the optical coupling element. An optically birefringent waveguide 30 is connected to the waveguide 810*c*, with the length of the waveguide 30 being chosen such that the latter behaves like a quarter wave plate with an alignment determined by the orientation of the rectangular cross section. The birefringence of the waveguide 30 occurs on account of its material properties or its core cross-sectional form, which is for example rectangular and non-square, or elliptical and non-circular. A further waveguide-based optical coupling element 10*c* is connected to the output of the birefringent waveguide 30 and its main axes are twisted through 45° in relation to the main axes of the birefringent waveguide 30 which acts as a quarter wave plate. The main axes of the waveguide 30 are defined by the polarization directions of the associated polarization eigenstates of the birefringent waveguide 30 and, in the case of a rectangular or elliptical cross section of the waveguide 30, arise from the directions defined by the sides of the cross section rectangle or by the main axes of the cross section ellipse. The waveguide 810*d* remains open at one end and serves for power measurement only.

If light is coupled from the fiber to the structure with any desired superposition of two orthogonally polarized LP01 modes corresponding to a certain polarization state, this yields a characteristic power distribution at the outputs 811*d*, 370*a*, 380*a*, 370*b*, 380*b*, 370*c*, 380*c*, it being possible to measure said power distribution by using appropriately positioned photodetectors. Using this power distribution, it is possible to uniquely reconstruct the polarization state of the light coupled into the structure; see, e.g. K. Kikuchi et al., Multi-level signaling in the Stokes space and its application to large-capacity optical communications, Optics Express, Vol. 22, No. 7, 2014, and so a comparatively cost-effectively producible polarization analyzer can be provided with the aid of the structure 1200 in combination with suitable data processing and preferably a calibration. In this case, a photodiode array, preferably an image sensor, which is applied without complicated adjustment in the emission direction of the sketched outputs can be used for the power detection. Alternatively, the various outputs 811*d*, 370*a*, 380*a*, 370*b*, 380*b*, 370*c*, 380*c* can be connected to further optical component parts, for example photodetectors or optical fibers, by using additional waveguides and/or micro-optical elements.

As a result of the use, sketched in FIG. 16, of three optical coupling elements, a quarter wave plate and an output 811*d* used for power measurement only, the polarization state at the output of the structure is already over determined. The redundant information can be used to check the reliability of the measurement. Alternatively, the structure can also be further simplified, for example by virtue of dispensing with the output 811*d* used for power measurement only.

Figure 17:
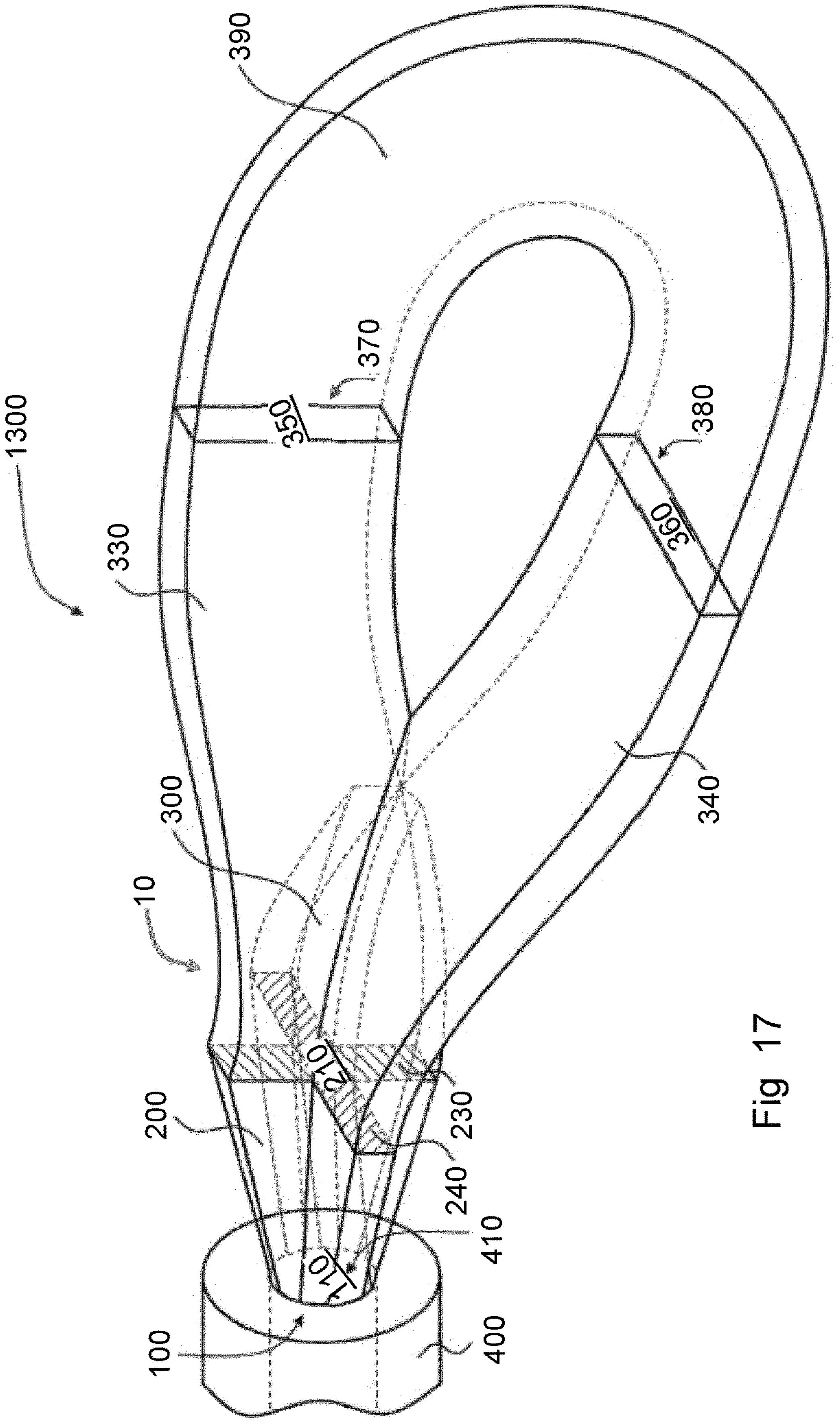
FIG. 17 shows a schematic representation of a reflective polarization swapper which, in a manner similar to a Faraday rotator mirror, interchanges signal components which are present for example in two mutually orthogonally polarized fundamental modes (so-called LP01 modes) of an optical fiber and couples said signal components back into the fiber in the opposite polarization direction.

FIG. 17 shows a reflective polarization swapper which, in a manner similar to a Faraday rotator mirror, interchanges signal components which are present in two mutually orthogonally polarized fundamental modes (so-called LP01 modes) of an optical fiber, which adopts the role of the optical component part 400 in this case, and couples said signal components back into the fiber in the opposite polarization direction. Of the three optical coupling points 100, 370, 380 of the waveguide-based optical coupling element 10, the first optical coupling point 100 is connected to the optical fiber while the two further optical coupling points 370, 380 are interconnected by way of a twisted waveguide 390.

Figure 18:
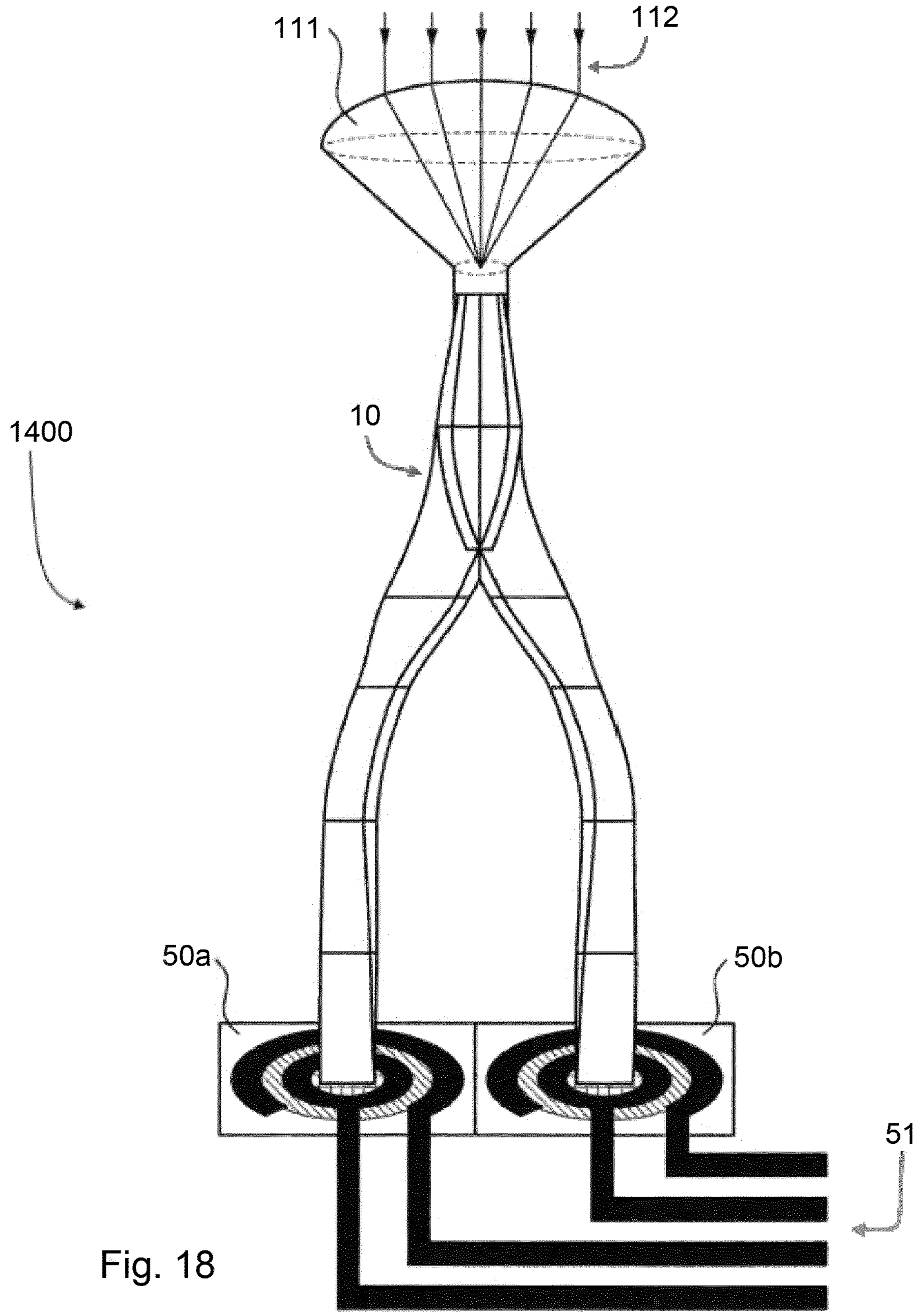
FIGS. 18 and 19 each show a schematic representation of an application of the arrangement according to the invention in the form of a polarization-sensitive image sensor.
Figure 19:
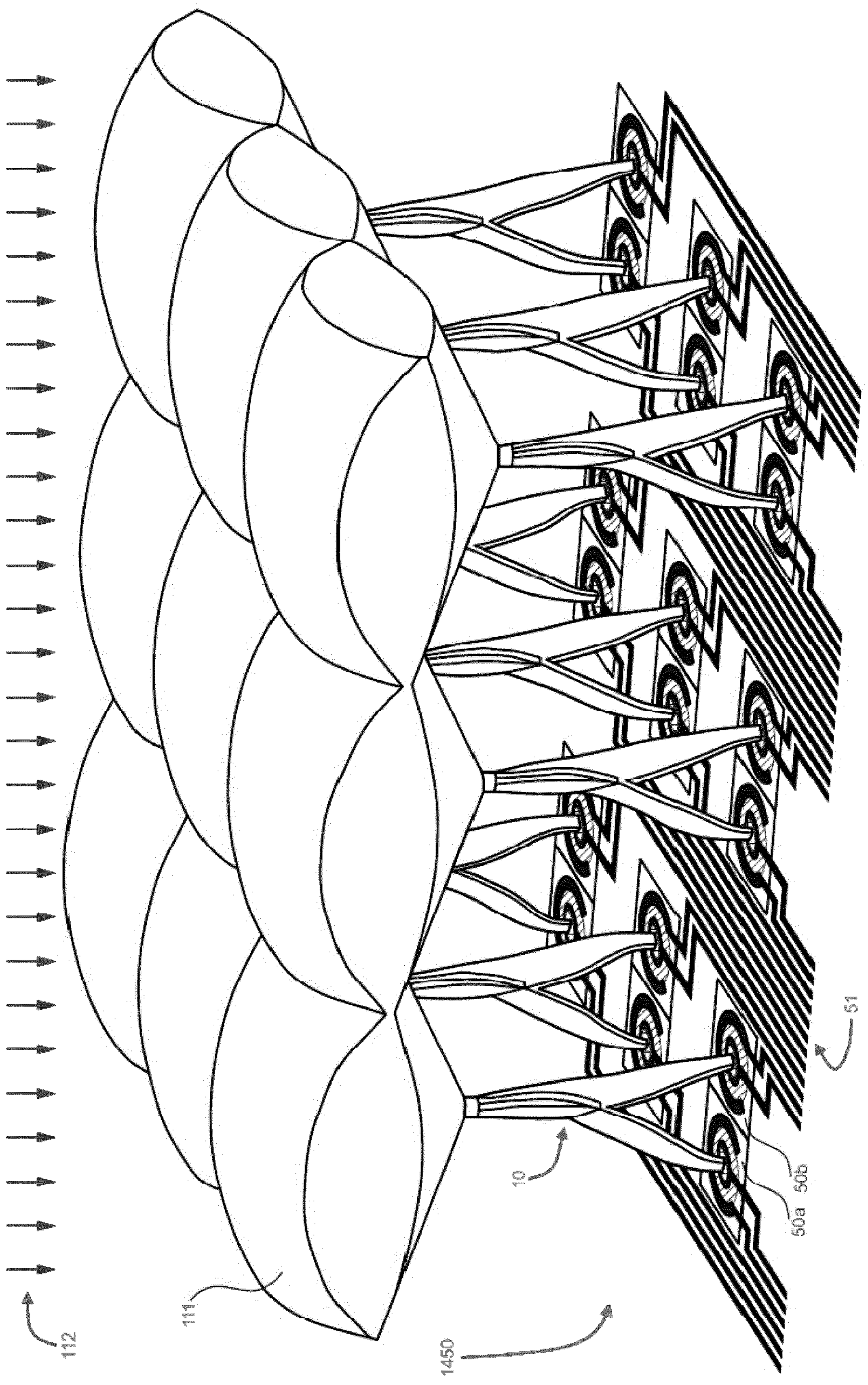

FIGS. 18 and 19 show an application of the arrangement according to the invention, in the form of a polarization-sensitive image sensor 1400, 1450. The individual structure sketched in FIG. 18 in this case comprises a free-form lens 111, whereby light 112 incident from the outside can initially be coupled into the waveguide-based optical coupling element 10. Following the separation of the two polarizations, the corresponding signal components are transferred to two photodetectors 50*a*, 50*b*, which are connected to the two further optical coupling points 370, 380 of the waveguide-based optical coupling element 10, and are converted there into electrical signals which are guided through the electrical lines 51. The photodetectors 50*a*, 50*b* can preferably be individual detectors of an image sensor, and so a polarization-sensitive image sensor can be constructed by a periodic continuation of the structure sketched in FIG. 18, said polarization-sensitive image sensor being able to be used to detect the spatial distribution of the incident power, separated according to the two polarizations.

FIG. 19 shows an array-like repetition of structures 1400, whereby a polarization-sensitive image sensor 1450 or a polarization-sensitive camera with a multiplicity of pixels can be produced.

Figure 20:
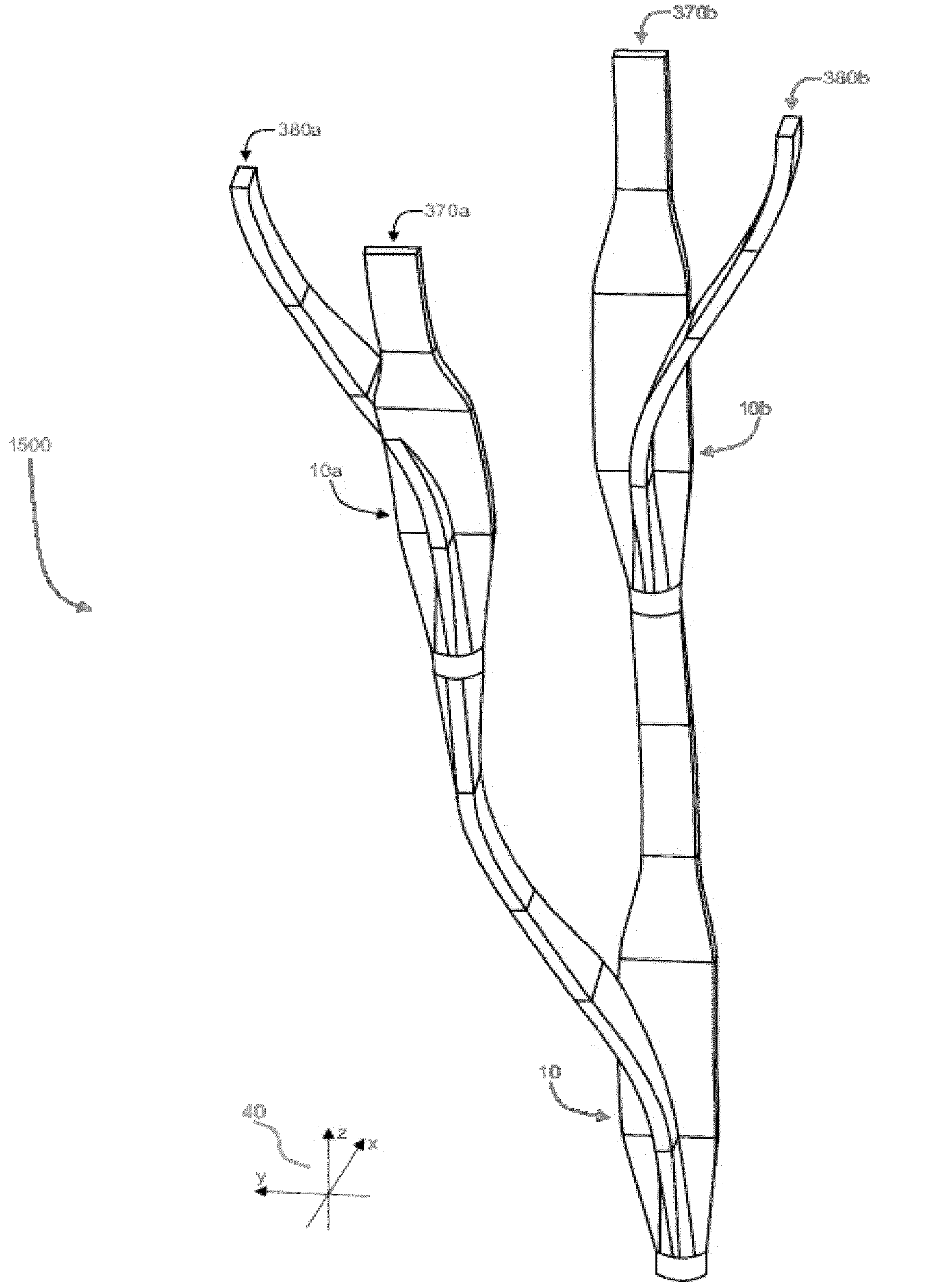
FIG. 20 shows a schematic representation of a cascade of a plurality of waveguide-based optical coupling elements, which can be produced together by using a free-form microstructuring method.

FIG. 20 shows a cascade 1500 of a plurality of waveguide-based optical coupling elements 10, 10*a*, 10*b*, which can be produced together by using a free-form microstructuring method. By using such an arrangement, it is possible, in particular, to improve the polarization extinction ratio at the optical coupling points 370*a*, 380*a*, 370*b*, 380*b*.

Figure 21:
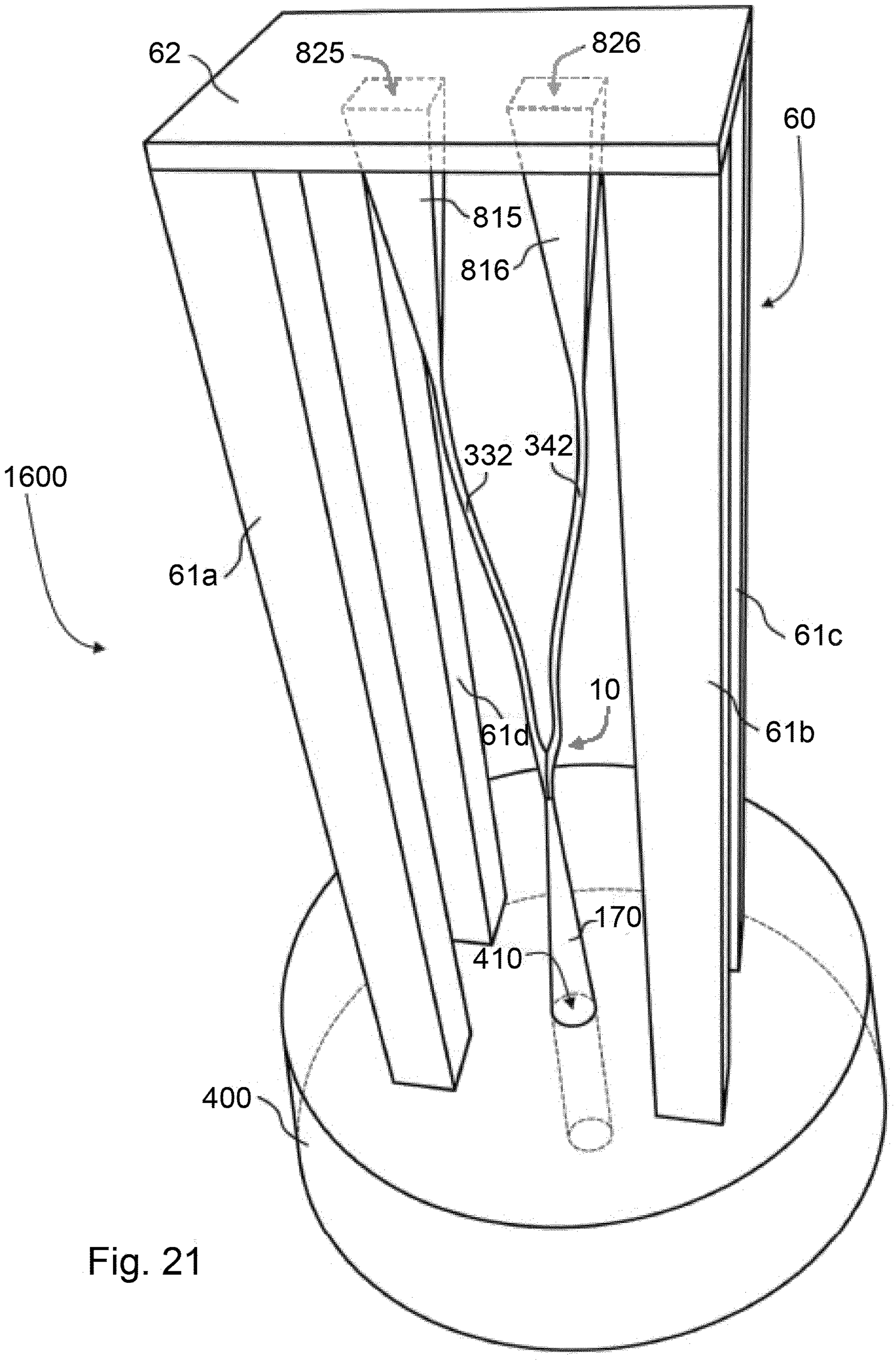
FIGS. 21 and 22 each show a schematic representation of an arrangement in which the waveguide-based optical coupling element is connected to a single mode fiber with one optical coupling point while the other optical coupling points are mechanically stabilized by an additional structure.

FIG. 21 shows an arrangement 1600 in which the waveguide-based optical coupling element 10 is connected to a single mode fiber, which at this point adopts the role of the optical component part 400, and whose outputs are mechanically stabilized by an additional structure 60. An optical signal which at the further optical coupling point 410 is coupled into the taper 170 leading to the waveguide-based optical coupling element 10 from the single mode fiber is initially split into two signal components, which correspond to the degenerate orthogonally polarized LP01 eigenmodes of the associated fiber core. As a result of the twisted waveguide sections 332, 342, the separated signal components are then matched in terms of their polarization direction and are output coupled at optical coupling points 825, 826 with a mode profile that is adjustable by the taper 815, 816. The positions of the further optical coupling points 825, 826 are anchored at a slab-shaped partial structure 62 of the mechanical support structure 60 carried by columns 61*a*, 61*b*, 61*c*, 61*d*. Distance and position of the further optical coupling points 825, 826 can be chosen freely.

Figure 22:
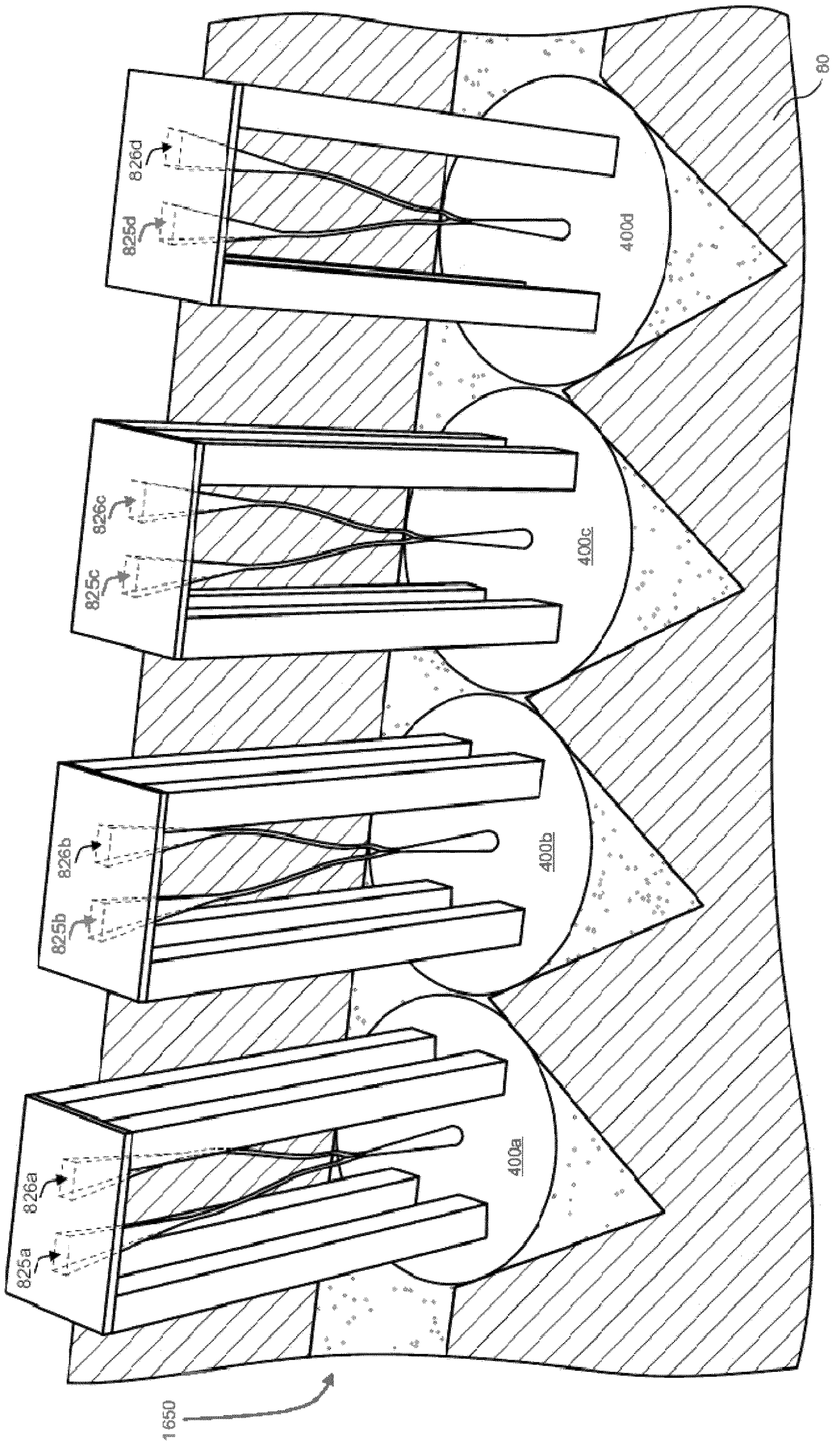

FIG. 22 shows an arrangement 1650, which represents an extension of the arrangement 1600 from FIG. 21 to form an array 80 of input fibers 400*a*, 400*b*, 400*c*, 400*d*. By choosing the distances of the associated outputs 825*a*, 826*a*; 825*b*, 826*b*; 825*c*, 826*c*; 825*d*, 826*d*, the arrangement can also be connected on the output side to a fiber array or to a waveguide array situated on a chip. In this embodiment, the arrangement 1650 corresponds to a multichannel polarizing beam splitter.

Figure 23:
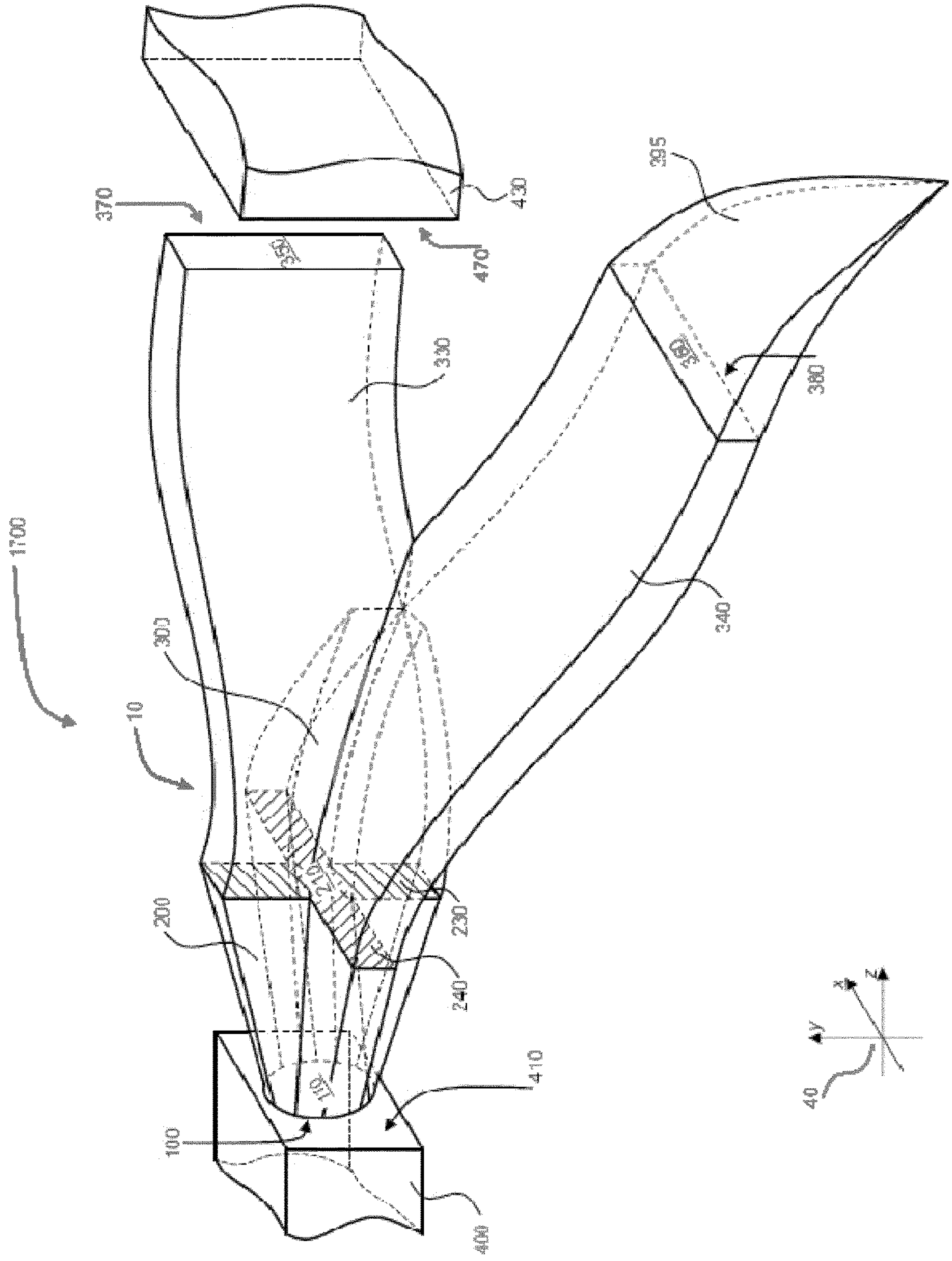
FIG. 23 shows a schematic representation of a use of the arrangement according to the invention as a polarization filter.

In exemplary fashion, FIG. 23 shows an arrangement 1700 in which the waveguide-based optical coupling element 10 is used as a polarization filter. In the sketched arrangement 1700, an optical signal to be filtered in terms of polarization is emitted by an optical component part 400, at the optical coupling point 410 of which the waveguide-based optical coupling element 10 is connected with its first optical coupling point 100. The desired signal filtered in relation to the polarization is then available in one of the guided eigenmodes of the second optical coupling point 370, while the signal component to be suppressed by the polarization filtering is supplied to a termination element (beamdump)) 395 connected to the third optical coupling point 380. In the case sketched in FIG. 23, the beamdump is embodied in the form of a continuously tapering taper structure, through which the light is emitted laterally, for example in the direction of an absorbing surface. Many aspects of the arrangement sketched in FIG. 23 can be modified. For example, the roles of the second optical coupling point 370 and the third optical coupling point 380 can be interchanged, without this changing the functional principle at all. Configurations are also conceivable, in which light is coupled in at the first optical coupling point 100 from free space, without physical contact with an optical component part being present there, and in which the third optical coupling point 370 is coupled to an optical component part. Coupling to an optical component can be implemented either directly or, as described above, via corresponding connecting waveguides or free beam coupling stretches.

| List of reference signs | |
|---|---|
| 10, 10a-10d | (waveguide-based) optical coupling element |
| 11 | plane of symmetry |
| 20a, 20b | multimode interference coupler |
| 30 | birefringent waveguide which behaves like a quarter wave plate |
| 40 | coordinate system of the lithography system |
| 50a, 50b | photodetectors |
| 51 | electrical lines |
| 60 | mechanical support structure |
| 61a-61d | columns of the mechanical support structure |
| 62 | partial structure of the mechanical support structure, carried by the columns |
| 71a, 71b | integrated-optical waveguide |
| 72a, 72b, 170, 170a-170f, 331, 341, 815, 816, 850, 860 | taper structures |
| 73a, 73b | facets of the integrated-optical waveguides |
| 74a, 74b | optical coupling points of the integrated-optical waveguides |
| 80 | fiber array |
| 100, 370, 370a-370c, 380, 380a-380c | optical coupling points of the optical coupling element |
| 110, 350, 360 | waveguide cross sections (facets) at the optical coupling points of the optical coupling element |
| 111, 333, 343, 413, 833, 843 | beam-shaping elements |
| 112 | incident light |
| 120, 130; 120a, 130a | orthogonal eigenmodes at the first optical coupling point |
| 140,150 | intensity distributions of the electric field vectors |
| 160, 310a-310d, 320a-320d, 830, 840 | connecting waveguide |
| 200, 300 | waveguide sections of the optical coupling element |
| 210 | waveguide cross section consisting of a superposition of waveguide cross sections |
| 230, 240 | waveguide cross sections |
| 250, 260; 270, 280 | orthogonal eigenmodes at the second and third optical coupling points |
| 301 | cross section of a superposition of partial waveguides in a waveguide region |
| 302a, 302b | cross sections of the partial waveguides in a waveguide region |
| 311a-311d | extensive structure elements for whisper gallery mode-guidance |
| 330, 340, 332, 342, 390 | partial waveguides or (twisted) waveguide segments of the optical coupling element |
| 351, 361 | centroids of the waveguide cross sections 350, 360 |
| 355, 365 | single mode cross sections of the taper structures 331, 341 |
| 371, 381 | centroids of the cross sections 355, 365 |
| 372, 382 | lateral offset of the centroids 371, 381 in relation to the centroids 351,361 |
| 395 | termination element (beamdump) |
| 400, 430, 440 | optical component parts |
| 400a-400d | optical fiber |
| 410, 470, 480 | optical coupling points of the optical component parts |
| 411, 412, 471, 472, 481, 482 | adjustment marks |
| 500 | capping material or cladding material |

-continued

| List of reference signs | |
|---|---|
| 600 | waveguide region of the optical coupling element, in which the partial waveguides are very close together or spatially overlap |
| 610 | waveguide region of the optical coupling element in which the partial waveguides are spatially disjoint |
| 720, 770 | multi-core fiber |
| 730a-730d, 770a-770g | cores of the multi-core fibers |
| 740a-740d | polarization-maintaining fiber |
| 750a-750d | fiber cores |
| 760 | stress-generating element |
| 810a-810d | connecting waveguide |
| 811d, 825a-825d, 826a-826d | further optical coupling points |
| 1000, 1050, 1060, 1100, 1200, 1300, 1400, 1450, 1500, 1600, 1650, 1700 | additional functional optical elements or arrangements of such elements, which are produced in situ together with the waveguide-based optical coupling element |

The Invention claimed is:

1. An arrangement for optical coupling and for mode-selective separation or superposition of optical fields, comprising a waveguide-based optical coupling element having at least three optical coupling points, the waveguide-based optical coupling element comprising a core region and a cladding region adjoining the core region, a refractive index difference of at least 0.05 occurring between the core region and the cladding region, the waveguide-based optical coupling element being designed in the form of a three-dimensional free-form structure, wherein along a portion of the waveguide-based optical coupling element corresponding to a transition region between the at least three optical coupling points, a centerline of the transition region exhibits a non-zero torsion, and a cross-section of the transition region undergoes a continuous deformation characterized by a monotonic rotation or morphing of a principal confinement axis about the centerline, at least one first optical coupling point having at least two differing guided eigenmodes assigned to the first optical coupling point, at least one second optical coupling point having at least one guided eigenmode assigned to the second optical coupling point, and at least one third optical coupling point having at least one guided eigenmode assigned to the third optical coupling point, at least one optical component part which has at least one further optical coupling point;

wherein at least one of the optical coupling points of the waveguide-based optical coupling element is optically connected to the at least one further optical coupling point of the optical component part, and wherein the waveguide-based optical coupling element is configured to efficiently bidirectionally transfer light between at least one first guided eigenmode assigned to the first optical coupling point and the at least one guided eigenmode assigned to the second optical coupling point and between at least one second guided eigenmode assigned to the first optical coupling point and the at least one guided eigenmode assigned to the third optical coupling point; and wherein the waveguide-based optical coupling element is configured to separate the at least two guided eigenmodes assigned to the first optical coupling point into different polarizations and to subsequently rotate one direction of the polarizations of the separated eigenmodes in order to facilitate an alignment of the directions of the polarizations to the at least one guided eigenmode assigned to the second optical coupling point and to the guided eigenmode assigned to the at least one third optical coupling point.

2. The arrangement of claim 1, wherein at least one of the second optical coupling point and the third optical coupling point is coupled to a further optical component part.

3. The arrangement of claim 1, wherein the second optical coupling point and the third optical coupling point are spatially separated from one another, and wherein the waveguide-based optical coupling element is configured to separate an optical input field present at the first optical coupling point into partial fields of different polarization and to output couple optical signals comprised by the partial fields at the second optical coupling point and the third optical coupling point, or wherein the waveguide-based optical coupling element is designed to superpose optical signals in the form of spatially overlapping partial fields of different polarization input coupled at the second optical coupling point and the third optical coupling point and provide said superposition at the first optical coupling point.

4. The arrangement of claim 1, wherein the waveguide-based optical coupling element comprises at least two partial waveguides, the partial waveguides being arranged close together or in spatially intersecting fashion in a first region, the partial waveguides, when considered in isolation from one another, having strongly decoupled eigenmodes at least sectionally, and the partial waveguides being spatially disjoint in a second region.

5. The arrangement as claimed in claim 1, wherein the waveguide-based optical coupling element comprises at least one first waveguide region which adjoins the first optical coupling point and in which a first waveguide cross section is continuously converted into a second waveguide cross section which comprises an superposition of two waveguide cross sections that individually have strongly decoupled eigenmodes, the at least two guided eigenmodes assigned to the first optical coupling point being arranged orthogonal to one another in the first waveguide cross section or two mutually orthogonal linear combinations of the at least two guided eigenmodes assigned to the first optical coupling point from the first waveguide cross section being converted into the strongly guided eigenmodes of the two waveguide cross sections; and at least one second waveguide region which adjoins the first waveguide region and in which the initially overlapping waveguide cross sections are guided apart into disjoint cross sections which define the second optical coupling point and the third optical coupling point.

6. The arrangement of claim 5, wherein the conversion of the first waveguide cross section into the second waveguide cross section in the first waveguide region is implemented by a continuous deformation of the cross section along the propagation direction of the light.

7. The arrangement of claim 5, wherein the waveguide cross sections in each case form a simply connected region having an aspect ratio of at least 1.5.

8. The arrangement of claim 1, wherein the first optical coupling point is directly or indirectly, via further waveguide segments or beam-shaping structure elements, optically coupled to a waveguide having a low index contrast and degenerate or virtually degenerate orthogonal eigenmodes or to an optical fiber; or wherein the second optical coupling point or the third optical coupling point is directly or indirectly, via further waveguide segments or beam-shaping structure elements, optically coupled to a waveguide having a high index contrast and strongly decoupled orthogonal eigenmodes or to a semiconductor-based integrated-optical waveguide.

9. The arrangement of claim 1, wherein the first optical coupling point is in direct physical contact with the further optical coupling point of the optical component part; or is not in direct physical contact with the further optical coupling point of the optical component part, wherein the light is propagating through an at least regionally homogeneous medium between the first optical coupling point and the further optical coupling point.

10. The arrangement of claim 1, wherein the first optical coupling point is configured to receive light from a free space or wherein the first optical coupling point comprises a lens configured to couple light in from the free space.

11. The arrangement of claim 1, wherein the core region has a refractive index of 1.3 to 1.8.

12. A polarization filter, comprising the arrangement of claim 1 and a termination element connected to one of the second optical coupling point or to the third optical coupling point of the waveguide-based optical coupling element.

13. A waveguide-based polarizing beam splitter, wherein the arrangement of claim 1 further has at least one connecting waveguide.

14. A passive optical waveguide structure for a coherent polarization multiplex receiver in a combination of at least two waveguide-based coupling elements, wherein the arrangement of claim 1 further has at least one connecting waveguide.

15. A passive optical waveguide structure for a polarization analyzer in a combination of at least two waveguide-based coupling elements, wherein the arrangement of claim 1 further has at least one power splitter.

16. A passive optical waveguide structure for a polarization-sensitive image sensor in a combination of at least two waveguide-based coupling elements, wherein the arrangement of claim 1 further has at least one micro-optical free-form element.

17. The arrangement of claim 1, wherein at least one waveguide path includes a non-planar segment in which a tangent vector twists about a longitudinal axis while maintaining confinement of the same guided mode.

18. The arrangement of claim 1, wherein the transition region of the waveguide-based optical coupling element includes a splitter region in which at least two of the optical coupling points are connected by respective guided-mode propagation paths whose principal optical axes are non-coplanar, non-coplanarity of the principal optical axes being defined by the principal optical axes forming a three-dimensional spatial angle greater than zero degrees at the splitter region, and the guided-mode propagation paths further exhibiting continuous curvature in three dimensions along a length sufficient to maintain adiabatic mode evolution.

* * * * *